United States Patent
Asghari et al.

(10) Patent No.: US 11,500,071 B2
(45) Date of Patent: Nov. 15, 2022

(54) STEERING OF OUTPUT SIGNALS IN LIDAR SYSTEMS

(71) Applicant: SiLC Technologies, Inc., Monrovia, CA (US)

(72) Inventors: Mehdi Asghari, La Canada Flintridge, CA (US); Dazeng Feng, El Monte, CA (US); Bradley Jonathan Luff, La Canada Flintridge, CA (US)

(73) Assignee: SiLC Technologies, Inc., Monrovia, CA (US)

(*) Notice: Subject to any disclaimer, the term of this patent is extended or adjusted under 35 U.S.C. 154(b) by 359 days.

(21) Appl. No.: 16/752,605

(22) Filed: Jan. 24, 2020

(65) Prior Publication Data

US 2020/0241119 A1   Jul. 30, 2020

Related U.S. Application Data

(60) Provisional application No. 62/797,126, filed on Jan. 25, 2019.

(51) Int. Cl.

| | |
|---|---|
| *G01S 7/481* | (2006.01) |
| *G01S 17/88* | (2006.01) |
| *G02B 6/12* | (2006.01) |
| *G02F 1/29* | (2006.01) |
| *G02F 1/295* | (2006.01) |
| *G02F 1/313* | (2006.01) |
| *G02B 6/124* | (2006.01) |

(52) U.S. Cl.
CPC ......... *G01S 7/4817* (2013.01); *G01S 7/4818* (2013.01); *G01S 17/88* (2013.01); *G02B 6/124* (2013.01); *G02B 6/12004* (2013.01); *G02F 1/292* (2013.01); *G02F 1/2955* (2013.01); *G02F 1/3132* (2013.01); *G02F 2203/05* (2013.01); *G02F 2203/24* (2013.01)

(58) Field of Classification Search
None
See application file for complete search history.

(56) References Cited

U.S. PATENT DOCUMENTS

| | | | |
|---|---|---|---|
| 4,523,803 A * | 6/1985 | Arao | G02B 6/12004 385/115 |
| 6,567,573 B1 | 5/2003 | Domash et al. | |
| 9,157,790 B2 | 10/2015 | Shpunt et al. | |
| 9,575,341 B2 | 2/2017 | Heck et al. | |
| 9,753,351 B2 | 9/2017 | Eldada | |

(Continued)

OTHER PUBLICATIONS

Baghmisheh, B. B., "Chip-scale Lidar", 2017, University of California, Berkeley.

(Continued)

*Primary Examiner* — Michelle R Connelly
(74) *Attorney, Agent, or Firm* — Gavrilovich, Dodd & Lindsey LLP

(57) ABSTRACT

A LIDAR system includes a demultiplexer that separates an outgoing LIDAR signal into multiple LIDAR output signals that each carries a different channel and the different channels are each at a different wavelength. The system also includes a beam distributor that receives each of the LIDAR output signals. The beam distributor directs the received LIDAR output signals such that different LIDAR output signals travel away from the beam distributor in different directions.

19 Claims, 9 Drawing Sheets

(56) References Cited

U.S. PATENT DOCUMENTS

| | | | |
|---|---|---|---|
| 9,841,495 B2 | 12/2017 | Campbell et al. | |
| 9,857,468 B1* | 1/2018 | Eichenholz | G01S 17/26 |
| 11,162,789 B2* | 11/2021 | Lodin | G01S 17/66 |
| 2002/0159700 A1* | 10/2002 | Coroy | G02B 6/12011 385/39 |
| 2010/0271614 A1* | 10/2010 | Albuquerque | G02B 6/12004 356/4.01 |
| 2017/0153319 A1* | 6/2017 | Villeneuve | H01S 3/08086 |
| 2018/0306925 A1* | 10/2018 | Hosseini | G01S 17/42 |
| 2019/0101647 A1* | 4/2019 | Feshali | G01S 17/42 |
| 2019/0250253 A1* | 8/2019 | Hung | G01S 7/4814 |
| 2019/0346568 A1 | 11/2019 | Feng et al. | |
| 2019/0353977 A1* | 11/2019 | Hung | H01S 3/06787 |
| 2019/0369244 A1 | 12/2019 | Asghari et al. | |
| 2019/0369251 A1 | 12/2019 | Feng et al. | |
| 2019/0391242 A1 | 12/2019 | Asghari et al. | |
| 2020/0158839 A1* | 5/2020 | Lin | G01C 25/00 |

OTHER PUBLICATIONS

Issakov, V. "Radar Systems, Ch. 2. In Microwave Circuits for 24GHz Automotive Radar in Silicon-based Technologies", 2010, Berlin Heidelberg: Springer-Verlag.

Li, L., "Time-of-Flight Camera—An Introduction", 2014, TI Technical White Paper SLOA190B.

PI USA: http://www.pi-usa.us/products/PDF_Data/Q-522_Mini_Positioning_Stage_20150203.pdf, 2018.

PI USA: Active Optics: http://www.pi-usa.us/products/PDF_Data/S335_Fast_Tip-Tilt_Platform.pdf, 2018.

Self, S.A., "Focusing of spherical Gaussian beams", Applied Optics, 1983, 658-661.

Thomas, Shane, International Search Report and Written Opinion, PCT/US20/15113, United States Patent and Trademark Office, dated Apr. 23, 2020.

Velodyne, HDL-64E S2 Datasheet. Retrieved from http://velodynelidar.com/lidar/products/brochure/HDL-64E%20S2%20datasheet_2010_lowres.pdf, 2017.

* cited by examiner

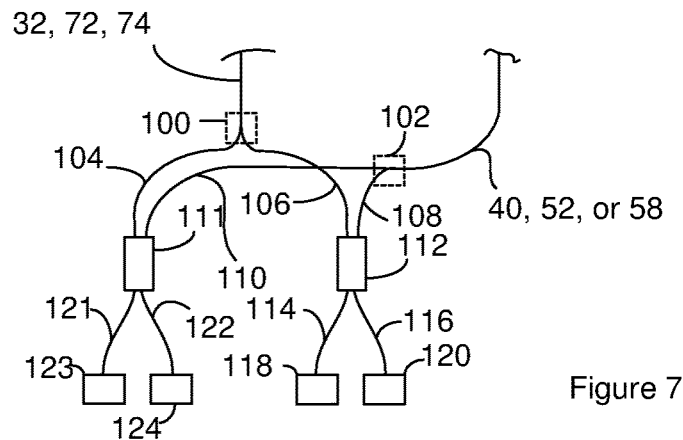
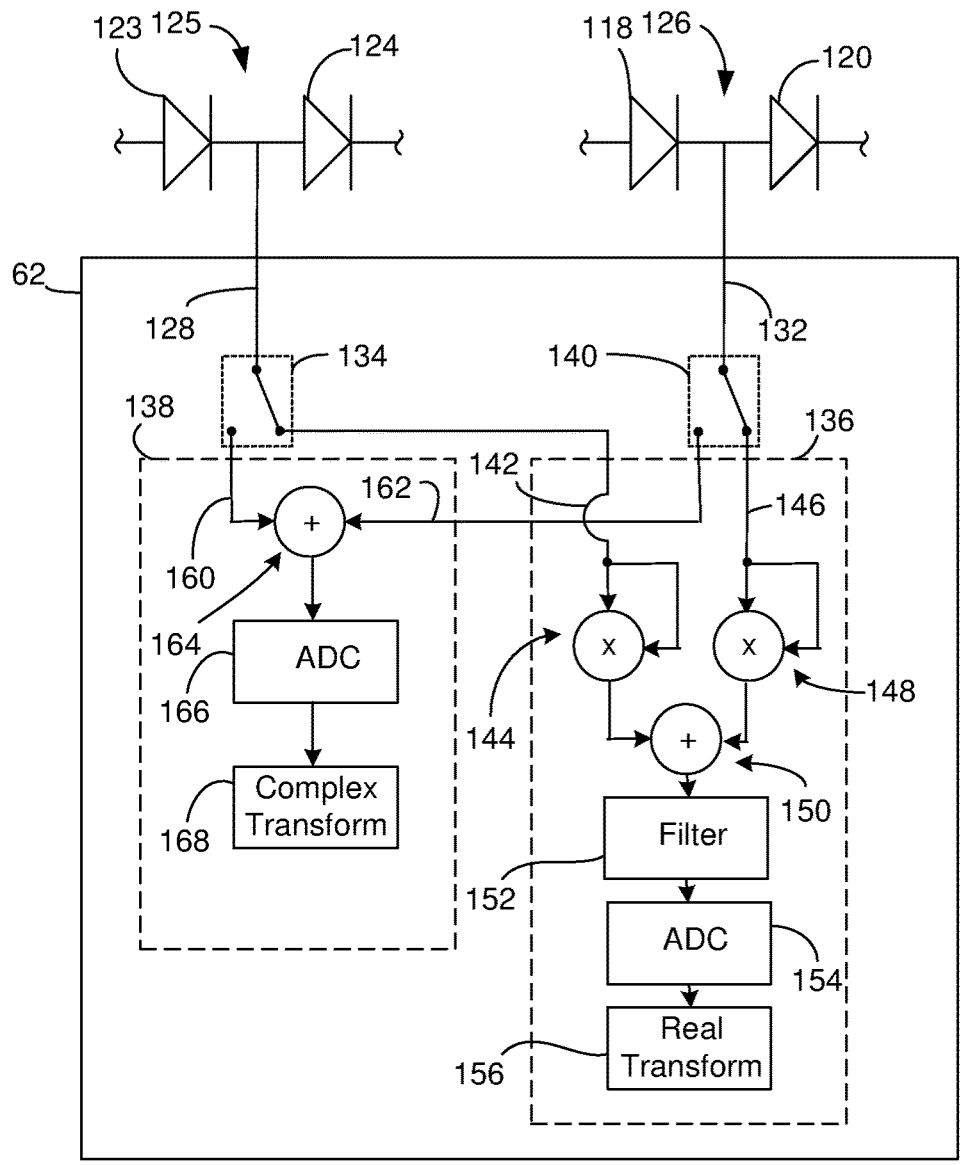
Figure 7A
Figure 7B

STEERING OF OUTPUT SIGNALS IN LIDAR SYSTEMS

RELATED APPLICATIONS

This application is a continuation of U.S. Patent Application Ser. No. 62/797,126, filed on Jan. 25, 2019, entitled "Optical Sensor System," and incorporated herein in its entirety.

FIELD

The invention relates to optical devices. In particular, the invention relates to LIDAR systems.

BACKGROUND

LIDAR technologies are being applied to a variety of applications. LIDAR specifications typically specify that LIDAR data be generated for a minimum number of sample regions in a field of view. In order to generate the LIDAR data for the different sample regions, a LIDAR output signal is typically scanned from one sample region to another. A variety of mechanisms are used to scan the LIDAR output signals. However, these mechanisms typically make use of moving parts such as the mirrors of MEMs devices. These devices are often not suitable for providing the high frequencies, repeatability, and long life that is need for LIDAR systems. As a result, there is a need for an improved mechanism of steering LIDAR output signals.

SUMMARY

A LIDAR system includes a demultiplexer that separates an outgoing LIDAR signal into multiple LIDAR output signals that each carries a different channel. The different channels are each at a different wavelength. The system also includes a beam distributor that receives each of the LIDAR output signals. The beam distributor directs the received LIDAR output signals such that different LIDAR output signals travel away from the beam distributor in different directions.

Another embodiment of a LIDAR system includes a demultiplexer that separates an outgoing LIDAR signal into multiple LIDAR output signals that are each received at an output side of the demultiplexer. Each of the LIDAR output signals carries a different channel and the different channels are each at a different wavelength. The system also includes a beam distributor that receives each of the LIDAR output signals. The beam distributor directs the received LIDAR output signals such that different LIDAR output signals travel away from the beam distributor in different directions. In some instances, the beam distributor includes, consists of, or consists essentially of a lens or a mirror.

A LIDAR system has a LIDAR chip that includes multiple channel waveguides. Each channel waveguide is configured to guide a LIDAR output signal. Different LIDAR output signals carry different channels. A beam distributor concurrently receives the LIDAR output signals from the channel waveguides. The beam distributor receives the LIDAR output signals such that each LIDAR output signal is incident on the beam distributor at a different angle of incidence. The beam distributor directs the received LIDAR output signals such that different LIDAR output signals travel away from the beam distributor in different directions.

BRIEF DESCRIPTION OF THE FIGURES

FIG. 7A illustrates an example of a processing unit.

FIG. 7B provides a schematic of electronics that are suitable for use with a processing unit constructed according to FIG. 7A.

FIG. 9A illustrates the demultiplexing component tuned to a first configuration and FIG. 9B illustrates the demultiplexing component tuned to a second configuration. FIG. 9C illustrates a beam distributor receiving LIDAR output signals at incident angles that change in response to tuning the demultiplexing component between the first configuration and the second configuration.

FIG. 10A illustrates the demultiplexing component tuned to a first configuration and FIG. 10B illustrates the demultiplexing component tuned to a second configuration.

FIG. 12A is a schematic of the optical switch. FIG. 12B is a schematic of a Mach-Zehnder interferometer that is suitable for using in the optical switch of FIG. 12A.

DESCRIPTION

The LIDAR system includes a demultiplexer that separates an outgoing LIDAR signal into multiple different LIDAR output signals that are each associated with a different channel. The LIDAR system also includes a beam distributor, such as a lens, that concurrently receives the LIDAR output signals and directs them to different sample regions in a field of view.

In some instances, the demultiplexer is tuned so as to change the path that each of the LIDAR output signals travels away from the demultiplexer. The change to the path that each of the LIDAR output signals travels away from the demultiplexer causes a change to the direction that the LIDAR output signals travel away from the beam distributor. As a result, the path that each of the LIDAR output signals travels away from the demultiplexer is tuned so as to scan the LIDAR output signals to different sample regions in the field of view.

A variety of mechanisms are suitable for tuning the paths that each of the LIDAR output signals travels away from the demultiplexer. For instance, mechanisms such as an optical switch, and temperature tuning can be integrated into optical platforms such as silicon-on-insulator platforms and can be solid-state mechanisms. As a result, a solid-state mechanism for steering LIDAR output signals is disclosed.

Figure 1A:
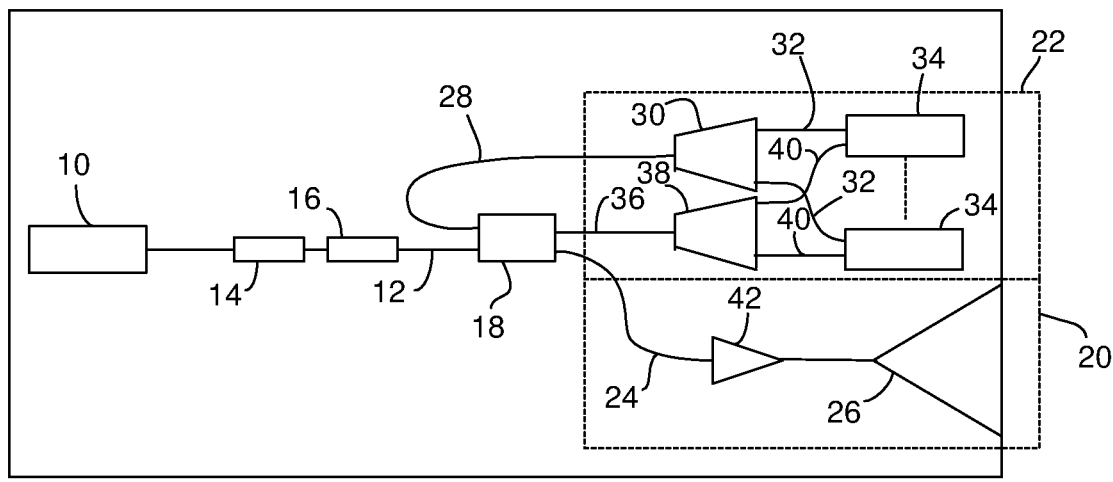
FIG. 1A is a schematic of a LIDAR system.

FIG. 1A is a schematic of a LIDAR system. The system includes a light source 10 such as a laser that outputs an outgoing light signal. The outgoing light signal carries multiple different channels that are each at a different wavelength. The wavelengths of the channels can be periodically spaced in that the wavelength increase from one channel to the next channel is constant or substantially constant. A suitable light source 10 for generating multiple channels with periodically spaced wavelengths includes, but is not limited to, comb lasers, multiple single wavelength lasers multiplexed into to single optical waveguide, sources such as that described in U.S. patent application Ser. No. 11/998,846, filed on Nov. 30, 2017, grated patent number 7542641, entitled "Multi-Channel Optical Device," and incorporated herein in its entirety.

The LIDAR system also includes a utility waveguide 12 that receives an outgoing light signal from the light source 10. A modulator 14 is optionally positioned along the utility waveguide 12. The modulator 14 is configured to modulate the power of the outgoing light signal and accordingly the LIDAR output signal(s). The electronics can operate the modulator 14. Accordingly, the electronics can modulate the power of the outgoing LIDAR signal and accordingly the LIDAR output signal(s). Suitable modulators 14 include, but are not limited to, PIN diode carrier injection devices, Mach-Zehnder modulator devices, and electro-absorption modulator devices. When the modulator 14 is constructed on a silicon-on-insulator platform, a suitable modulator is disclosed in U.S. patent application Ser. No. 617,810, filed on Sep. 21 1993, entitled Integrated Silicon PIN Diode Electro-Optic Waveguide, and incorporated herein in its entirety.

An amplifier 16 is optionally positioned along the utility waveguide 12. Since the power of the outgoing light signal is distributed among multiple channels, the amplifier 16 may be desirable to provide each of the channels with the desired power level on the utility waveguide 12. Suitable amplifiers include, but are not limited to, semiconductor optical amplifiers (SOAs).

The utility waveguide 12 carries the outgoing light signal from the modulator 14 to a signal-directing component 18. The signal-directing component 18 can direct the outgoing light signal to a LIDAR branch 20 and/or a data branch 22. The LIDAR branch outputs LIDAR output signals and receives LIDAR input signals. The data branch processes the LDAR input signals for the generation of LIDAR data (distance and/or radial velocity between the LIDAR system and a reflecting object located outside of the LIDAR system).

The LIDAR branch includes a LIDAR signal waveguide 24 that receives at least a portion of the outgoing light signal from the signal-directing component 18. The LIDAR signal waveguide 24 carries at least a portion of the outgoing light signal to a demultiplexing component 26. When the outgoing light signal carries multiple different channels at different wavelengths, the demultiplexing component 26 separates the outgoing light signal into multiple LIDAR output signals that are each at a different wavelength (channel) and are directed to different sample regions in a field of view. The demultiplexing component 26 outputs the LIDAR output signals which can be reflected by a reflecting object (not shown) located outside of the LIDAR system. The reflected LIDAR output signals return to the demultiplexing component 26 as LIDAR input signals. The demultiplexing component 26 combines the LIDAR input signals and outputs the result on the LIDAR signal waveguide 24 as an incoming light signal.

In some instances, the demultiplexing component 26 also includes beam steering functionality. In these instances, the demultiplexing component 26 can be in electrical communication with electronics (not shown) that can operate the demultiplexing component 26 so as to steer the LIDAR output signals to different sample regions in a field of view. The demultiplexing component 26 and/or electronics can be configured such that the different LIDAR output signals are steered independently or are steered concurrently.

Although the demultiplexing component 26 is illustrated as a single component, the demultiplexing component 26 can include multiple optical components and/or electrical components. Suitable demultiplexing components 26 include, but are not limited to, optical phased arrays (OPAs), transmission diffraction gratings, reflection diffraction gratings, and Diffractive Optical Elements (DOE). Suitable demultiplexing components 26 with beam steering capability include, but are not limited to, optical phased arrays (OPAs) with active phase control elements on the array waveguides.

The LIDAR signal waveguide 24 carries the incoming light signal to the signal-directing component 18. The signal-directing component 18 directs the incoming light signal to the utility waveguide 12 and/or a comparative signal waveguide 28. The portion of the incoming light signal directed to the comparative signal waveguide 28 serves a comparative incoming light signal.

The comparative signal waveguide 28 carries the comparative incoming light signal to a comparative demultiplexer 30. When the comparative light signal carries multiple channels, the comparative demultiplexer 30 divides the comparative incoming light signal into different comparative signals that each carries a different one of the channels. The comparative demultiplexer 30 outputs the comparative signals on different comparative waveguides 32. Each of the comparative waveguides 32 carries one of the comparative signals to a different processing component 34.

The signal-directing component 18 is configured such that when the signal-directing component 18 directs at least a portion of the incoming light signal to the comparative signal waveguide 28, the signal-directing component 18 also directs at least a portion of the outgoing light signal to a reference signal waveguide 36. The portion of the outgoing light signal received by the reference signal waveguide 36 serves as a reference light signal.

The reference signal waveguide 36 carries the reference light signal to a reference demultiplexer 38. When the reference light signal carries multiple channels, the reference demultiplexer 38 divides the reference light signal into different reference signals that each carries a different channel. The reference demultiplexer 38 outputs each of the reference signals on a different reference waveguide 40. The reference waveguides 40 each carry one of the reference signals to a different one of the processing components 34.

The comparative waveguides 32 and the reference waveguides 40 are configured such that a comparative signal and the corresponding reference signal are received at the same processing component 34. For instance, the comparative waveguides 32 and the reference waveguides 40 are configured such that the comparative signal and the corresponding reference signal carrying the same channel (of the same wavelength) are received at the same processing component 34.

As will be described in more detail below, each of the processing components 34 combines a comparative signal with the corresponding reference signal to form a composite signal that carries LIDAR data for a sample region on the field of view. Accordingly, the composite signal can be processed so as to extract LIDAR data for the sample region.

The signal-directing component 18 can be an optical coupler. When the signal-directing component 18 is an optical coupler, the signal-directing component 18 directs a first portion of the outgoing light signal to the LIDAR signal waveguide 24 and a second portion of the outgoing light signal to the reference signal waveguide 36 and also directs a first portion of the incoming light signal to the utility waveguide 12 and a second portion of the incoming light signal to the comparative signal waveguide 28. Accordingly, the second portion of the incoming light signal can serve as the comparative incoming light signal and the second portion of the outgoing light signal can serve as the reference light signal.

The signal-directing component 18 can be an optical switch such as a cross-over switch. A suitable cross-over switch can be operated in a cross mode or a pass mode. In the pass mode, the outgoing light signal is directed to the LIDAR signal waveguide 24 and an incoming light signal would be directed to the utility waveguide 12. In the cross mode, the outgoing light signal is directed to the reference signal waveguide 36 and the incoming light signal is directed to the comparative signal waveguide 28. Accordingly, the incoming light signal or a portion of the incoming light signal can serve as the comparative light signal and the outgoing light signal or a portion of the outgoing light signal can serve as the reference light signal.

An optical switch such as a cross-over switch can be controlled by the electronics. For instance, the electronics can control operate the switch such that the switch is in the cross mode or a pass mode. When the LIDAR output signal is to be transmitted from the LIDAR system, the electronics operate the switch such that the switch is in the pass mode. When the LIDAR input signal is to be received by the LIDAR system, the electronics operate the switch such that the switch is in the cross-over mode. The use of a switch can provide lower levels of optical loss than are associated with the use of an optical coupler as the signal-directing component 18.

In the above descriptions of the operation of the signal-directing component 18, the comparative light signals and the reference light signals are concurrently directed to the data branch 22. As a result, the processing components 34 can each combine a comparative signal with the reference signal carrying the same channel (corresponding reference signal).

In some instances, an optical amplifier 42 is optionally positioned along the LIDAR signal waveguide 24 and is configured to provide amplification of the outgoing light signal and/or of the incoming light signal. Accordingly, the effects of optical loss at the signal-directing component 18 can be reduced.

Figure 1B:
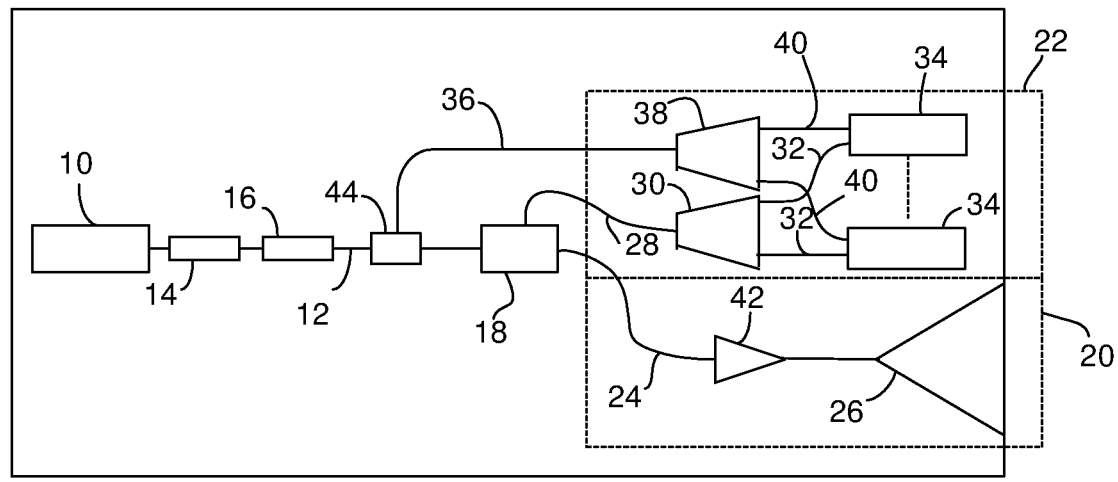
FIG. 1B is a schematic of another embodiment of a LIDAR system.

FIG. 1B illustrates the LIDAR system of FIG. 1A modified to include an optical circulator as the signal-directing component 18. The optical circulator is configured such that the outgoing light signal is directed to the LIDAR signal waveguide 24 and the incoming light signal is directed to the comparative signal waveguide 28. The comparative signal waveguide 28 carries the comparative incoming light signal to the comparative demultiplexer 30. Additionally, a tap component 44 is positioned along the utility waveguide 12. The tap component 44 is configured to tap off a first portion of the outgoing light signal such that the first portion of the outgoing light signal is received on the reference signal waveguide 36. The first portion of the outgoing light signal received by the reference signal waveguide 36 serves as the reference light signal. The reference signal waveguide 36 carries the reference light signal to the reference demultiplexer 38. Accordingly, the electronics can operate the LIDAR system of FIG. 1B as disclosed in the context of FIG. 1A. Suitable optical circulators include, but are not limited to, Faraday rotator based optical fiber circulators, and integrated optical circulators. Although the signal-directing component 18 of FIG. 1B is disclosed as an optical circulator, the signal-directing component 18 of FIG. 1B can be an optical coupler or optical switch.

Light from a laser source is typically linearly polarized and hence the LIDAR output signal is also typically linearly polarized. Reflection from a target may change the angle of polarization of the returned light. Accordingly, the LIDAR input signal can include light if different linear polarization states. For instance, a first portion of a LIDAR input signal can include light of a first linear polarization state and a second portion of a LIDAR input signal can include light of a second linear polarization state. The intensity of the resulting composite signals is proportional to the square of the cosine of the angle between the comparative and reference signal polarizations. If the angle is 90 degrees, the LIDAR data can be lost in the resulting composite signal. As a result, the LIDAR system can be modified to compensate for changes in polarization state of the LIDAR output signal.

Figure 2:
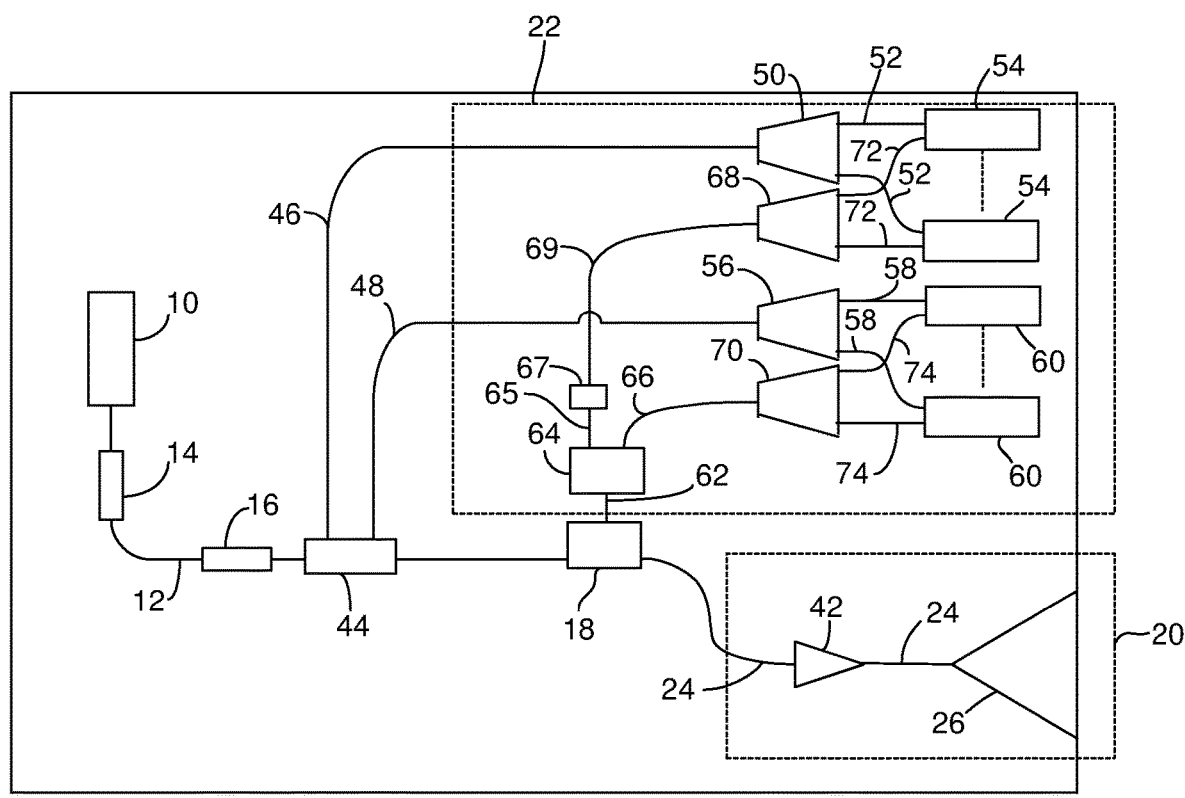
FIG. 2 is a schematic of another embodiment of a LIDAR system.

FIG. 2 is a schematic of the LIDAR system of FIG. 1A and/or FIG. 1B modified to compensate for changes in the polarization of the LIDAR output signal. A tap component 44 is positioned along the utility waveguide 12. The tap component 44 is configured to tap off a first portion of the outgoing light signal such that the first portion of the outgoing light signal is received on a first reference signal waveguide 46. The first portion of the outgoing light signal received by the first reference signal waveguide 46 serves as a first reference light signal. The tap component 44 is also configured to tap off a second portion of the outgoing light signal such that the second portion of the outgoing light signal is received on a second reference signal waveguide 48. The second portion of the outgoing light signal received by the second reference signal waveguide 48 serves as a second reference light signal.

The first reference signal waveguide 46 carries the first reference light signal to a first reference demultiplexer 50. When the first reference light signal includes multiple channels, the first reference demultiplexer 50 divides the first reference light signal into different first reference signals that each has a different wavelength. The first reference demultiplexer 50 outputs the first reference signals on different first reference waveguides 52. The first reference waveguides 52 each carry one of the first reference signals to one several first processing components 54.

The second reference signal waveguide 48 carries the second reference light signal to a second reference demultiplexer 56. When the second reference light signal includes multiple channels, the second reference demultiplexer 56 divides the second reference light signal into different second reference signals that each has a different wavelength. The second reference demultiplexer 56 outputs the second reference signals on different second reference waveguides 58. Each of the second reference waveguides 58 carries one of the second reference signals to a different one of several second processing components 60.

The utility waveguide 12 carries the outgoing light signal to the signal-directing component 18. The signal-directing component 18 directs the outgoing light signal to the LIDAR signal waveguide 24. The LIDAR signal waveguide 24 receives the incoming light signal from the demultiplexing component 26 and carries the incoming light signal to the signal-directing component 18. The signal-directing component 18 directs the incoming light signal to an intermediate waveguide 62. Suitable signal-directing components 18 include, but are not limited to, circulators, 2×2 optical couplers, 1×2 optical couplers, and switches.

The intermediate waveguide 62 carries the received portion of the incoming light signal to a beamsplitter 64. The beamsplitter 64 splits the beam into a precursor comparative incoming signal and a second comparative incoming signal. The precursor comparative incoming signal is received on a precursor comparative signal waveguide 65 and the second comparative incoming signal is received on a second comparative signal waveguide 66. The precursor comparative signal waveguide 65 carries the precursor comparative incoming signal to a polarization rotator 67. The polarization rotator 67 outputs a first comparative incoming signal that is received on a first comparative signal waveguide 69. The first comparative signal waveguide 69 carries the first comparative incoming signal to a first comparative demultiplexer 68 and the second comparative signal waveguide 66 carries the second comparative incoming signal to a second comparative demultiplexer 70.

When the first comparative incoming light signal carries multiple channels, the first comparative demultiplexer 68 divides the first comparative incoming light signal into different first comparative signals that each has a different wavelength. The first comparative demultiplexer 68 outputs the first comparative signals on different first comparative waveguides 72. The first comparative waveguides 72 each carry one of the first comparative signals to a different first processing component 54.

When the second comparative light signal includes multiple channels, the second comparative demultiplexer 70 divides the first comparative incoming light signal into different second comparative signals that each has a different wavelength. The second comparative demultiplexer 70 outputs the second comparative signals on different second comparative waveguides 74. The second comparative waveguides 74 each carry one of the second comparative signals to a different second processing component 60.

The first comparative waveguides 72 and the first reference waveguides 52 are configured such that a comparative signal and the corresponding reference signal are received at the same first processing component 54. For instance, the first comparative waveguides 72 and the first reference waveguides 52 are configured such that the first comparative signal and the first reference signal of the same wavelength are received at the same first processing component 54.

The second comparative waveguides 74 and the second reference waveguides 58 are configured such that a comparative signal and the reference signal carrying the same channel are received at the same second processing component 60. For instance, the second comparative waveguides 74 and the second reference waveguides 58 are configured such that the second comparative signal and the second reference signal of the same wavelength are received at the same second processing component 60.

The first processing components 54 each combines a first comparative signal with the corresponding first reference signal to form a first composite signal that carries LIDAR data for a sample region on the field of view. The second processing components 60 each combines a second comparative signal with the corresponding second reference signal to form a second composite signal that carries LIDAR data for a sample region on the field of view.

The LIDAR system is constructed such that the first comparative signals have the same polarization state angle as the corresponding second comparative signals. For instance, the beamsplitter 64 can be a polarizing beam splitter. One example of a polarizing beamsplitter is constructed such that the channels in the precursor comparative incoming signal have a first polarization state but do not have or do not substantially have a second polarization state and the channels in the second comparative incoming signal have a second polarization state but do not have or do not substantially have the first polarization state. For instance, the polarizing beamsplitter can route a portion of the incoming light signal having the first polarization state to the precursor comparative signal waveguide 65 and a portion of the incoming light signal having the second polarization state to the second comparative signal waveguide 66. The first polarization state and the second polarization state can be linear polarization states and the second polarization state is different from the first polarization state. For instance, the first polarization state can be TE and the second polarization state can be TM or the first polarization state can be TM and the second polarization state can be TE. Suitable beamsplitters include, but are not limited to, Wollaston prisms, MEMs-based polarizing beamsplitters and integrated optical polarizing beamsplitters using asymmetric y-branches, Mach-Zehnder interferometers and multi-mode interference couplers.

The polarization state rotator can be configured to change the polarization state of the channels in the precursor comparative incoming signal from the first polarization state to the second polarization state. As a result, the channels in the first comparative incoming signal have the second polarization state but do not have or do not substantially have the first polarization state. Accordingly, the channels in the first comparative incoming signal and the corresponding channels in the second comparative incoming signal each have the same polarization state (the second polarization state in this discussion). The first comparative signals that result from the first comparative incoming signal have the same polarization state angle as the corresponding second comparative signals that result from the second comparative incoming signal. Suitable polarization state rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multi-mode interference couplers.

Since the LIDAR output signal(s) are linearly polarized, the first reference signals can have the same linear polarization state angle as the corresponding second reference signals. For instance, the first reference signals and the second reference signals can each have the same polarization state as the first comparative incoming signal and the second comparative incoming signal. Accordingly, the first comparative signals, the second comparative signals, the first reference signals, and the second reference signals can each have the same polarization state. In this example, the first comparative signals, the second comparative signals, the first reference signals, and the second reference signals can each have light of the second polarization state.

As a result of the above configuration, the first composite signals each results from combining a reference signal and a comparative signal of the same polarization state and will accordingly provide the desired beating between the reference signal and the comparative signal. For instance, the first composite signals each results from combining a reference signal and a comparative signal of the first polarization state and excludes or substantially excludes light of the second polarization state or the first composite signals each results from combining a reference signal and a comparative signal of the second polarization state and excludes or substantially excludes light of the first polarization state. Similarly, the second composite signals each includes a reference signal and a comparative signal of the same polarization state will accordingly provide the desired beating between the reference signal and the comparative signal. For instance, the second composite signals each results from combining a reference signal and a comparative signal of the first polarization state and excludes or substantially excludes light of the second polarization state or the first composite signals each results from combining a reference signal and a comparative signal of the second polarization state and excludes or substantially excludes light of the first polarization state.

The above configuration results in the LIDAR data for a single sample region in the field of view being present in multiple different composite signals (i.e. the first composite signals and the second composite signal) generated for the sample region. In some instances, determining the LIDAR data for the sample region includes the electronics combining the LIDAR data from different composite signals (i.e. the first composite signals and the second composite signal). Combining the LIDAR data can include taking an average, median, or mode of the LIDAR data generated from multiple different composite signals. For instance, the electronics can average the distance between the source of a LIDAR output signal and the reflecting object determined from the first composite signal with the distance determined from the second composite signal and/or the electronics can average the radial velocity between the source of a LIDAR output signal and the reflecting object determined from the first composite signal with the radial velocity determined from the second composite signal.

In some instances, determining the LIDAR data for a sample region includes the electronics identifying one or more composite signals (i.e. the first composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (first composite signal or the second composite signal) with the larger amplitude as having the representative LIDAR data and can use the LIDAR data from identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Although FIG. 2 is described in the context of components being arranged such that the first comparative signals, the second comparative signals, the first reference signals, and the second reference signals each have the second polarization state, other configurations of the components in FIG. 2 can arranged such that the first composite signals result from combining a reference signal and a comparative signal of the same linear polarization state and the first composite signals result from combining a reference signal and a comparative signal of the same linear polarization state. For instance, the polarization state rotator can be positioned along the first reference signal waveguide 46 rather than between the precursor comparative signal waveguide 65 and the first comparative signal waveguide 69. As another example, when the first reference signals and the second reference signals each have the first polarization state, the polarization state rotator can be positioned along the second comparative signal waveguide 66.

The above system configurations result in the first portion of the LIDAR input signal (portion with the first polarization state) and the first portion of the LIDAR input signal (portion with the second polarization state) being directed into different composite signals. For instance, the system configuration can result in the first composite signals including more of the power from the first portion of the LIDAR input signal than the first composite signals and the second composite signals including more of the power from the second portion of the LIDAR input signal than the first composite signals. Alternately, the system configuration results in the first composite signals including more of the power from the second portion of the LIDAR input signal than the first composite signals and the second composite signals including more of the power from the first portion of the LIDAR input signal than the first composite signals. In some instances, the first portion of the LIDAR input signal has zero power or substantially zero power or the second portion of the LIDAR input signal has zero power or substantially zero power.

Figure 3:
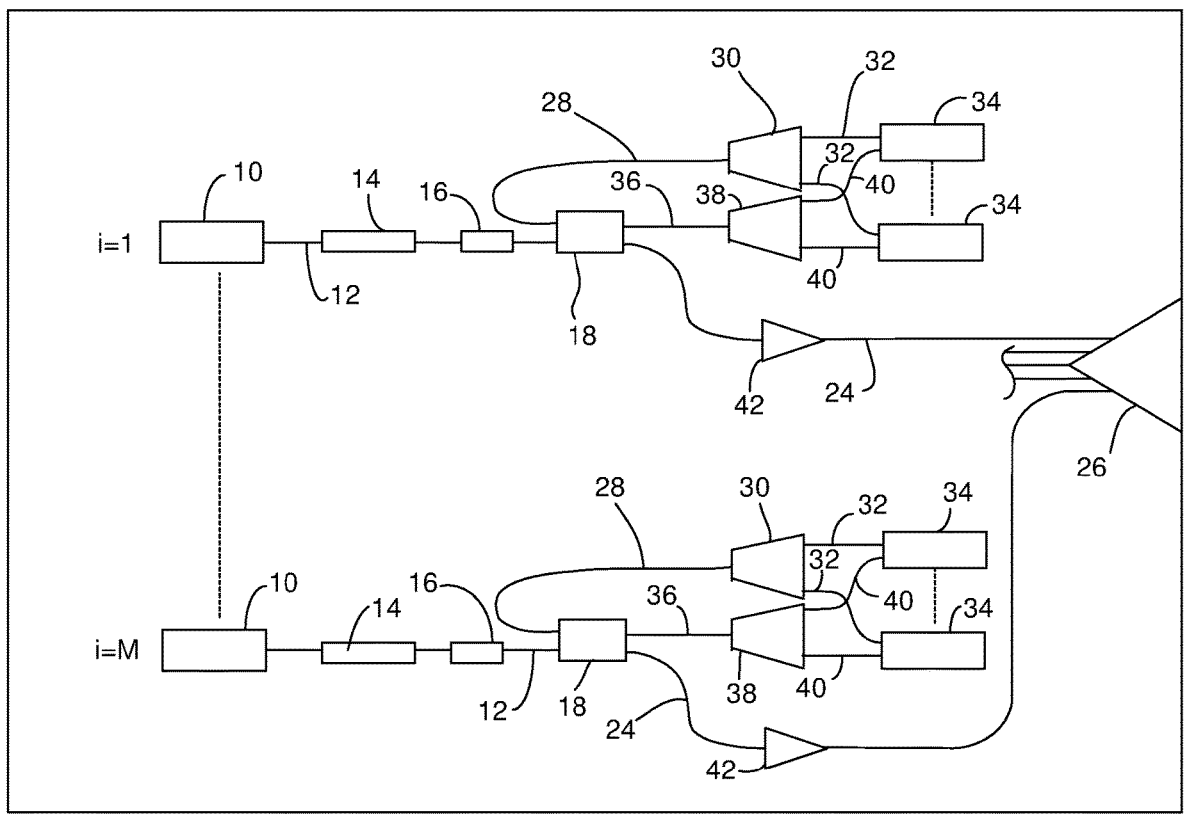
FIG. 3 is a schematic of another embodiment of a LIDAR system.

The above LIDAR systems can include more than one data branch associated with a LIDAR branch. For instance, the LIDAR system of FIG. 3 illustrates a LIDAR system where multiple light sources 10 provide channels to a LIDAR branch and multiple data branches receive light signals from the LIDAR branch.

Figure 4:
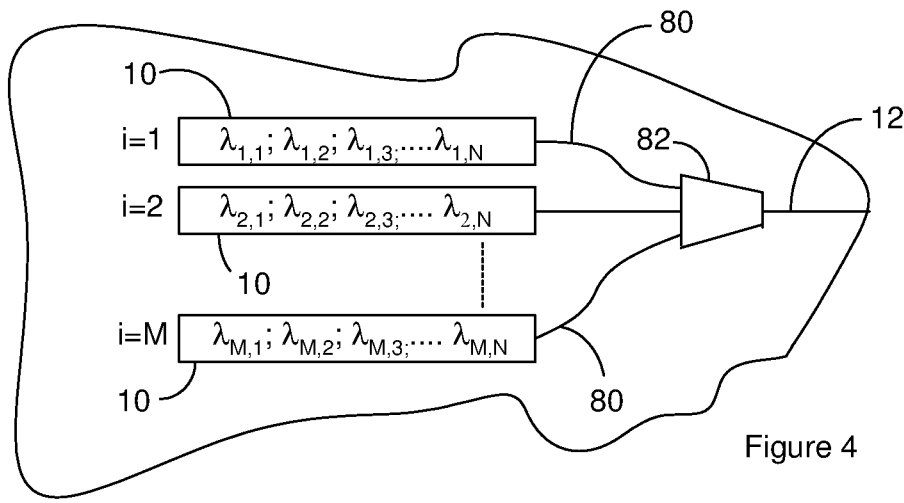
FIG. 4 illustrates multiple light sources configured to generate an outgoing light signal that carries multiple channels.

Although the above LIDAR systems are illustrated as having a single light source 10, the LIDAR system can have multiple light sources 10 as illustrated in FIG. 4. The light source 10 includes M light sources 10 that each generates N channels. The channels are each received on a channel waveguide 80. The channel waveguides carry the channels to a channel multiplexer 82 that combines the channels so as to form the outgoing light signal that is received on the utility waveguide 12.

In FIG. 4, each of the channels is labeled $\lambda_{i,j}$ where i is the number of the light source 10 and is from 1 to M and j is the number of the channel for light source 10 and is from 1 to N. As noted above, the light sources 10 can be configured such that the wavelengths of the channels are periodically spaced in that the wavelength increase from one channel to the next channel ($\Delta\lambda$) is constant or substantially constant. In some instances, the light sources 10 are configured such that channels with adjacent wavelengths are generated by different light sources 10. For instance, the light sources 10 can be configured such that $\lambda_{i,j}=\lambda_o+((i-1)+(j-1)(M))(\Delta\lambda)$.

Suitable light sources 10 for this configuration include, but are not limited to, comb lasers. In this configuration, the channel multiplexer can be a cyclic multiplexer designed with the wavelength spacing ((N−1)*−Δλ) equal to a multiple of the Free Spectral Range (FSR) of the channel multiplexer. Accordingly, the channel multiplexer can be designed to cycle over the wavelength range ((N−1)*−Δλ). A suitable cyclic multiplexer includes, but is not limited to, the 'colorless' AWG from Gemfire (8-Channel Cyclic Arrayed Waveguide Grating, 2018).

Suitable values for the number of light sources 10 (M) include, but are not limited to, values greater than or equal to 2, 4, or 8, and/or less than 16, 32, or 64. Suitable values for the number of channels provided by a light sources 10 (N) include, but are not limited to, values greater than or equal to 2, 4, or 8, and/or less than 16, 32, or 64. Suitable values for the wavelength increase from one channel to the next channel (Δλ) include, but are not limited to, values greater than or equal to 0.2 nm, 0.4 nm, or 0.6 nm, and/or less than 0.8 nm, 1.0 nm, or 1.5 nm. Suitable values for the wavelength of the channel with the shortest wavelength include, but are not limited to, values greater than or equal to 1.3 µm, 1.4 µm, or 1.5 µm, and/or less than 1.6 µm, 1.7 µm, or 1.8 µm. In one example, the LIDAR system includes M greater than or equal to 2, 4, or 8, and/or less than 16, 32, or 64; N greater than or equal to 2, 4, or 8, and/or less than 16, 32, or 64; and Δλ greater than or equal to 0.2 nm, 0.4 nm, or 0.6 nm, and/or less than 0.8 nm, 1 nm, or 1.5 nm.

In some instances, the light sources 10 are configured such that at least a portion of the light sources 10 each generates two or more channels with adjacent wavelengths. For instance, the light sources 10 can be configured such that $\lambda_{i,j}=\lambda_o+((j-1)+(i-1)(N))(\Delta\lambda)$. Suitable light sources 10 for this configuration include, but are not limited to, comb lasers. In this configuration, the channel multiplexer can be a broadband multiplexer with a bandwidth of at least NΔλ. Suitable broadband multiplexers include, but are not limited to, arrayed waveguide gratings (AWG) and thin film filters.

Figure 5:
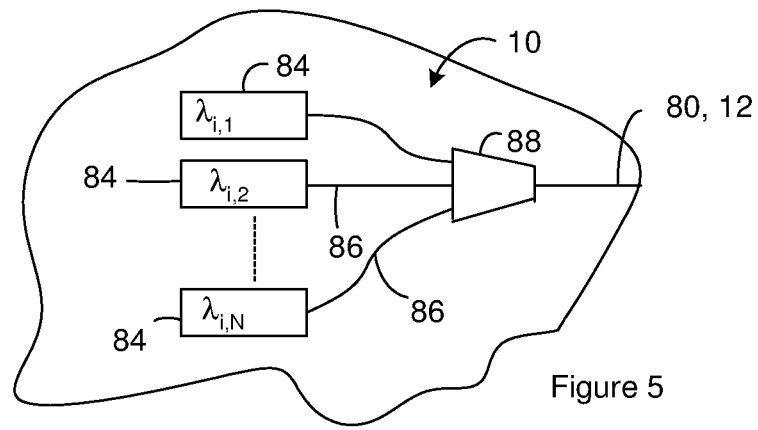
FIG. 5 illustrates a light source that includes multiple laser sources.

As noted above, one or more of the light sources 10 can be a comb laser. However, other constructions of the light source 10 are possible. For instance, FIG. 5 illustrates an example of a light source 10 that includes multiple laser sources 84. The light source 10 illustrated in FIG. 5 includes multiple laser sources 84 that each outputs one of the channels on a source waveguide 86. The source waveguides 86 carry the channels to a laser multiplexer 88 that combines the channels so as to form a light signal that is received on a channel waveguide or the utility waveguide 12. The electronics can operate the laser sources 84 so the laser sources 84 concurrently output each of the channels. Suitable lasers for use with a light source 10 constructed according to FIG. 5 include, but are not limited to, external cavity lasers, distributed feedback lasers (DFBs), and Fabry-Perot (FP) lasers. External cavities lasers are advantageous in this embodiment because of their generally narrower linewidths, which can reduce noise in the detected signal.

Figure 6:
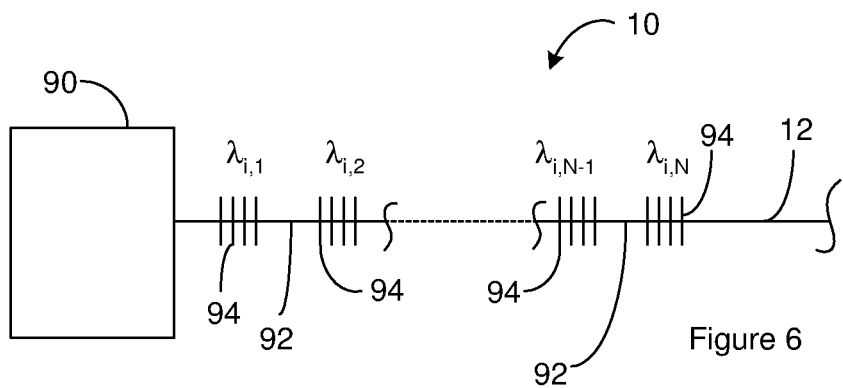
FIG. 6 illustrates one example of a structure configured to generate a light signal that includes multiple channels.

FIG. 6 illustrates another example of a possible light source 10 construction. The light source 10 includes a gain element 90 such as the gain element of a semiconductor laser. A gain waveguide 92 is optically aligned with the gain element so as to receive a light signal from the gain element. In some instances, the gain waveguide excludes the gain medium included in the gain element. For instance, the gain waveguide can be a ridge waveguide on a silicon-on-insulator chip. Multiple partial return devices 94 are positioned along the gain waveguide such that the partial return devices interact with the light signal.

During operation, electronics operate the gain element such that the gain medium outputs the light signal. The partial return devices 94 each passes a portion of the light signal. The portion of the light signal that the utility waveguide 12 receives from the partial return devices serves as the outgoing light signal. The partial return devices also return a portion of the light signal to the gain element such that the returned portion of the light signal travels through the gain element. The gain element can include a fully or partially reflective layer that receives returned portion of the light signal from the gain element and reflects the returned portion of the light signal back to the gain element allowing the returned portion of the light signal to amplify and lase. Accordingly, the light source 10 can be an external cavity laser.

The partial return devices can be configured such that the each partial return device returns a different wavelength of light. For instance, the partial return devices can be configured such that the wavelength of each one of the channels that is to be output by the light source 10 is returned by at least one of the partial return devices. As a result, each of the desired channels will lase and be present in the outgoing light signal. Suitable partial return devices include, but are not limited to, Bragg gratings.

FIG. 7A through FIG. 7B illustrate an example of a suitable processing components for use in the above LIDAR systems. A first splitter 102 divides a reference signal carried on a reference waveguide 40, 52, or 58 onto a first reference waveguide 110 and a second reference waveguide 108. The first reference waveguide 110 carries a first portion of the reference signal to a light-combining component 111. The second reference waveguide 108 carries a second portion of the reference signal to a second light-combining component 112.

A second splitter 100 divides the comparative signal carried on the comparative waveguide 30, 72, or 74 onto a first comparative waveguide 104 and a second comparative waveguide 106. The first comparative waveguide 104 carries a first portion of the comparative signal to the light-combining component 111. The second comparative waveguide 108 carries a second portion of the comparative signal to the second light-combining component 112.

The second light-combining component 112 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal. The light-combining component 112 also splits the resulting second composite signal onto a first auxiliary detector waveguide 114 and a second auxiliary detector waveguide 116.

The first auxiliary detector waveguide 114 carries a first portion of the second composite signal to a first auxiliary light sensor 118 that converts the first portion of the second composite signal to a first auxiliary electrical signal. The second auxiliary detector waveguide 116 carries a second portion of the second composite signal to a second auxiliary light sensor 120 that converts the second portion of the second composite signal to a second auxiliary electrical signal. Examples of suitable light sensors include germanium photodiodes (PDs), and avalanche photodiodes (APDs).

The first light-combining component 111 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal. The light-combining component 111 also splits the first composite signal onto a first detector waveguide 121 and a second detector waveguide 122.

The first detector waveguide 121 carries a first portion of the first composite signal to a first light sensor 123 that converts the first portion of the second composite signal to a first electrical signal. The second detector waveguide 122 carries a second portion of the second composite signal to a second auxiliary light sensor 124 that converts the second portion of the second composite signal to a second electrical signal. Examples of suitable light sensors include germanium photodiodes (PDs), and avalanche photodiodes (APDs).

The first reference waveguide 110 and the second reference waveguide 108 are constructed to provide a phase shift between the first portion of the reference signal and the second portion of the reference signal. For instance, the first reference waveguide 110 and the second reference waveguide 108 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 110 and the second reference waveguide 108 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 123 and the second light sensor 124 can be connected as a balanced detector and the first auxiliary light sensor 118 and the second auxiliary light sensor 120 can also be connected as a balanced detector. For instance, FIG. 7B provides a schematic of the relationship between the electronics, the first light sensor 123, the second light sensor 124, the first auxiliary light sensor 118, and the second auxiliary light sensor 120. The symbol for a photodiode is used to represent the first light sensor 123, the second light sensor 124, the first auxiliary light sensor 118, and the second auxiliary light sensor 120 but one or more of these sensors can have other constructions. In some instances, all of the components illustrated in the schematic of FIG. 7B are included on the LIDAR system. In some instances, the components illustrated in the schematic of FIG. 7B are distributed between the LIDAR system and electronics located off of the LIDAR system.

The electronics connect the first light sensor 123 and the second light sensor 124 as a first balanced detector 125 and the first auxiliary light sensor 118 and the second auxiliary light sensor 120 as a second balanced detector 126. In particular, the first light sensor 123 and the second light sensor 124 are connected in series. Additionally, the first auxiliary light sensor 118 and the second auxiliary light sensor 120 are connected in series. The serial connection in the first balanced detector is in communication with a first data line 128 that carries the output from the first balanced detector as a first data signal. The serial connection in the second balanced detector is in communication with a second data line 132 that carries the output from the first balanced detector as a second data signal. The first data signal and the second data signal are beating as a result of the beating between the comparative signal and the reference signal, i.e. the beating in the first composite signal and in the second composite signal.

The first data line 128 carries the first data signal to a first switch 134. The first switch can be in a first configuration where the first data signal is carried to a distance branch 136 or in a second configuration where the first data signal is carried to a velocity branch 138. In FIG. 7B, the first switch 134 is shown in the first configuration. The second data line 132 carries the second data signal to a second switch 140. The second switch can be in a first configuration where the second data signal is carried to the distance branch 136 or in a second configuration where the second data signal is carried to a velocity branch 138. In FIG. 7B, the second switch 140 is shown in the first configuration. A suitable switch for use as the first switch and/or second switch includes, but is not limited to, an electromechanical switch, and a solid state MOSFET or PIN diode switch.

The electronics operate the first switch and the second switch such that they are in the same configuration during the first period and during the second period. For instance, the electronics can operate the first switch and the second switch such that the first switch and the second switch are both in the first configuration during the first period and both in the second configuration during the second period. In this example, the first data signal and the second data signal are carried to the distance branch 136 during the first period and to the velocity branch 138 during the second period.

During operation of the LIDAR system, the generation of LIDAR data is divided into a series of cycles where LIDAR data is generated for each cycle. In some instances, each of the cycles corresponds to a different sample region in the field of view. Accordingly, different cycles can generate LIDAR data for different regions in a field of view.

The cycles can be performed such that the time for each cycle can be divided into different time periods that include a distance time period (first period) and a velocity time period (second period). The distance between the reflecting object and the LIDAR chip can be determined in the distance period and the radial velocity between the reflecting object and the LIDAR chip can be determined in the velocity period.

The electronics are configured to use the first data signal and the second data signal to determine or approximate at least the distance between the LIDAR system and the reflecting object. For instance, during the first period, the electronics can operate the modulator 14 so as to add chirp to the amplitude of the outgoing LIDAR signal and accordingly the LIDAR output signal. Adding chirp to the amplitude can include modulating the amplitude of the outgoing LIDAR signal such that the amplitude of the outgoing LIDAR signal is a function of a sinusoid. In one example, the amplitude of the outgoing LIDAR signal is modulated such that the amplitude of the outgoing LIDAR signal is a square root of a function that includes a sinusoid and/or is a square root of a sinusoid. For instance, the outgoing LIDAR signal can be modulated so as to produce a modulated outgoing LIDAR signal and LIDAR output signal mathematically represented by Equation 1: $(M+N*\cos(C*t+D*t^2))^{1/2} \cos(F*t)$ where M, N, C, D and F are constants, t represents time, $M>0$, $N>0$, and $M>N$ in order to prevent the radicand from becoming negative, C>0, D≠0. As will become evident below, F can be a function of the frequency of the LIDAR output signal ($f_c$). In Equation 1, F and C can be selected such that F>>C.

The distance branch includes a first distance branch line 142. During the first period, the first distance branch line 142 carries the first data signal to a first multiplier 144. In FIG. 7B, the first multiplier 144 is configured to square the amplitude of the first data signal and to output a first multiplied data signal. The distance branch includes a second distance branch line 146. During the first period, the second distance branch line 146 carries the second data signal to a second multiplier 148. In FIG. 7B, the second multiplier 148 is configured to square the amplitude of the second data signal and to output a second multiplied data signal. Suitable first multipliers and/or second multipliers include, but are not limited to, RF mixers such as a Gilbert cell mixer.

The distance branch includes an adder 150 that sums the first multiplied data signal and the second multiplied data signal. The adder outputs a summed data signal. Suitable adders include, but are not limited to, RF combiners including resistive or hybrid combiners. The distance branch includes a low-pass filter 152 that receives the summed data signal and outputs a beating data signal. The low-pass filter is selected to remove higher frequency contributions to the summed data signal that are artifacts of the mixing of the reference and return signals. The low-pass filter can be selected to have a bandwidth greater than or equal to: $f_{dmax}/2 + \alpha \tau_{0max}$ where $f_{dmax}$ represents the maximum level of the Doppler shift of the LIDAR input signal relative to the LIDAR input signal for which the LIDAR system is to provide reliable results, $\tau_{0max}$ represents maximum delay between transmission of the LIDAR output signal and the receipt of the LIDAR input signal, and $\alpha$ represents the rate of change in the frequency of the chirp added to the amplitude of the modulated outgoing LIDAR signal during the duration of the sample period (i.e. the first period). In some instances, $\alpha$ is determined from B/T where B represents the change in the frequency of the chirp added to the amplitude of the modulated outgoing LIDAR signal during the duration of the sample period and T is the duration of the sample period. In some instances, T is determined from:

$$T = \frac{\lambda_c}{2\Delta v_{min}} + \tau_{0max}$$

where $\lambda_c$ represents the wavelength of the outgoing LIDAR signal, $\Delta v_{min}$: represents velocity resolution and B can be determined from $$B = \frac{cT}{2(T - \tau_{0max})\Delta R_{min}}$$

where c represents the speed of light and $\Delta R_{min}$ represents distance resolution. In some instances, the filter has a bandwidth greater than 0.1 GHz, 0.2 GHz, or 0.3 GHz and/or less than 0.4 GHz, 0.5 GHz, or 1 GHz. Corresponding values for the sweep period (T) can be 10 µs, 8 µs, 4 µs, 3 µs, 2 µs, and 1 µs.

The distance branch includes an Analog-to-Digital Converter (ADC) 154 that receives the beating data signal from the filter. The Analog-to-Digital Converter (ADC) 154 converts the beating data signal from an analog form to digital form and outputs the result as a digital LIDAR data signal. As discussed above, the conversion of the beating data signal includes sampling the beating data signal at a sampling rate. The addition of the chirp to the amplitude of the LIDAR output signal substantially reduces or removes the effects of radial velocity from the beating of the composite signal and the resulting electrical signals. For instance, the frequency shift of the LIDAR output signal relative to the LIDAR input signal ("frequency shift," $\Delta f$) can be written as $\Delta f = \Delta f_d + \Delta f_s$ where $\Delta f_d$ represents the change in frequency due to the Doppler shift and $\Delta f_s$ is the change in frequency due to the separation between the reflecting object and the LIDAR system. The outgoing LIDAR signal can be modulated so as to produce a modulated outgoing LIDAR signal and accordingly, a LIDAR output signal that is also modulated, where the change in frequency due to the Doppler shift ($\Delta f_d$) is less than 10%, 5%, 1%, or even 0.1% of the Doppler shift that would occur from a sinusoidal LIDAR output signal serving as the LIDAR and having a constant amplitude and the same frequency as the modulated outgoing LIDAR signal and/or the LIDAR output signal. For instance, the outgoing LIDAR signal and/or the LIDAR output signal can be modulated so as to produce a modulated outgoing LIDAR signal and/or a LIDAR output signal where the change in frequency due to the Doppler shift ($\Delta f_d$) is less than 10%, 5%, 1%, or even 0.1% of the Doppler shift that would occur from a continuous wave serving as the LIDAR output signal and having the same frequency as the modulated outgoing LIDAR signal and/or the LIDAR output signal. In another example, the outgoing LIDAR signal and/or the LIDAR output signal are modulated so as to produce a modulated outgoing LIDAR signal and/or a LIDAR output signal where the change in frequency due to the Doppler shift ($\Delta f_d$) is less than 10%, 5%, 1%, or even 0.1% of the Doppler shift that would occur from the outgoing LIDAR signal before modulation (the unmodulated outgoing LIDAR signal) serving as the LIDAR output signal. These results can be achieved by increasing the value of the Equation 1 variable F relative to C. For instance, F can represent $2\pi f_c$ and C can represent $2\pi f_1$ where $f_1$ denotes the base frequency of the frequency-chirp in the amplitude of the modulated outgoing LIDAR signal. Accordingly, F can be increased relative to C by increasing the value of the frequency of the LIDAR output signal ($f_c$) relative to the chirp base frequency ($f_1$). As an example, $f_c$ and $f_1$ can be selected such that $f_c >> f_1$. In some instances, $f_c$ and $f_1$ are selected such that a ratio of $f_c : f_1$ is greater than 2:1, 10:1, $1 \times 10^4$:1, $5 \times 10^4$, or $1 \times 10^5$:1 and/or less than $5 \times 10^5$, $1 \times 10^6$, $5 \times 10^6$ or $5 \times 10^8$. Accordingly, the variables F and C can also have these same values for a ratio of F:C. The reduction and/or removal of the change in frequency due to the Doppler shift ($\Delta f_d$) from the frequency shift lowers the beat frequency and accordingly reduces the required sampling rate.

The distance branch includes a transform module 156 that receives the digital LIDAR data signal from the Analog-to-Digital Converter (ADC) 154. The transform module 156 is configured to perform a real transform on the digital LIDAR data signal so as to convert from the time domain to the frequency domain. This conversion provides an unambiguous solution for the shift in frequency of the shift of the LIDAR input signal relative to the LIDAR input signal that is caused by the distance between the reflecting object and the LIDAR system. A suitable real transform is a Fourier transform such as a Fast Fourier Transform (FFT). The classification of the transform as a real transform distinguishes the transform from complex transforms such as complex Fourier transforms. The transform module can execute the attributed functions using firmware, hardware or software or a combination thereof.

Since the frequency provided by the transform module does not have input from, or does not have substantial input from, a frequency shift due to relative movement, the determined frequency shift can be used to approximate the distance between the reflecting object and the LIDAR system. For instance, the electronics can approximate the distance between the reflecting object and the LIDAR system ($R_0$) using Equation 3: $R_0 = c*\Delta f/(2\alpha)$ where $\Delta f$ can be approximated as the peak frequency output from the transform module, and c is the speed of light.

The velocity branch can be configured to use the first data signal and the second data signal to determine or approximate at least the radial velocity of the LIDAR system and the reflecting object. The LIDAR output signal with a frequency that is a function of time disclosed in the context of FIG. 1A through FIG. 2 can be replaced by a LIDAR output signal where the frequency of the LIDAR output signal is not a function of time. For instance, the LIDAR output signal can be a continuous wave (CW). For instance, during the second period, the modulated outgoing LIDAR signal, and accordingly the LIDAR output signal, can be an unchirped continuous wave (CW). As an example the modulated outgoing LIDAR signal, and accordingly the LIDAR output signal, can be represented by Equation 2: $G*\cos(H*t)$ where G and H are constants and t represents time. In some instances, G represents the square root of the power of the outgoing LIDAR signal and/or H represents the constant F from Equation 1. In instances where the output of the light source has the waveform that is desired for the modulated outgoing LIDAR signal, the electronics need not operate the modulator 14 so as to modify the outgoing LIDAR signal. In these instances, the output of the light source(s) can serve as the modulated outgoing LIDAR signal and accordingly the LIDAR output signal. In some instances, the electronics operate the modulator 14 so as to generate a modulated outgoing LIDAR signal with the desired form.

Since the frequency of the LIDAR output signal is constant in the second period, changing the distance between reflecting object and LIDAR system does not cause a change to the frequency of the LIDAR input signal. As a result, the separation distance does not contribute to the shift in the frequency of the LIDAR input signal relative to the frequency of the LIDAR output signal. Accordingly, the effect of the separation distance has been removed or substantially from the shift in the frequency of the LIDAR input signal relative to the frequency of the LIDAR output signal.

The velocity branch includes a first velocity branch line 160 and a second velocity branch line 160. During the second period, the first velocity branch line 160 carries the first data signal to an Analog-to-Digital Converter (ADC) 164 which converts the first data signal from an analog form to a digital form and outputs a first digital data signal. As discussed above, the conversion of the first data signal is done by sampling the first data signal at a sampling rate. The use of a continuous wave as the LIDAR output signal substantially removes the effects of distance between the reflecting object and LIDAR system from the beating of the composite signal and the resulting electrical signals. Accordingly, the beating frequency is reduced and the required sampling rate is reduced.

The second velocity branch line 162 carries the second data signal to an Analog-to-Digital Converter (ADC) 166 which converts the second data signal from an analog form to a digital form and outputs a second digital data signal. As discussed above, the conversion of the second data signal includes sampling the second data signal at a sampling rate. The use of a continuous wave as the LIDAR output signal substantially reduces or removes the effects of distance between the reflecting object and LIDAR system from the beating of the second composite signal and the resulting electrical signals. Accordingly, the beating frequency is reduced and the required sampling rate is reduced.

The sampling rate for the Analog-to-Digital Converter (ADC) 164 can be the same or different from the sampling rate for the Analog-to-Digital Converter (ADC) 166.

The velocity branch includes a transform module 168 that receives the first digital data signal from the Analog-to-Digital Converters (ADC) 164 and the second digital data signal from the Analog-to-Digital Converters (ADC) 166. Since the first data signal is an in-phase component and the second data signal its quadrature component, the first data signal and the second data signal together act as a complex velocity data signal where the first data signal is the real component and the second data signal is the imaginary component. As a result, the first digital data signal can be the real component of a digital velocity data signal and the second data signal can be the imaginary component of the digital velocity data signal. The transform module 168 can be configured to perform a complex transform on the digital velocity data signal so as to convert from the time domain to the frequency domain. This conversion provides an unambiguous solution for the shift in frequency of LIDAR input signal relative to the LIDAR input signal that is caused by the radial velocity between the reflecting object and the LIDAR system. A suitable complex transform is a Fourier transform such as a complex Fast Fourier Transform (FFT). The transform module can execute the attributed functions using firmware, hardware or software or a combination thereof.

Since the frequency shift provided by the transform module 168 does not have input from a frequency shift due to the separation distance between the reflecting object and the LIDAR system, and because of the complex nature of the velocity data signal, the output of the transform module 168 can be used to approximate the radial velocity between the reflecting object and the LIDAR system. For instance, the electronics can approximate the radial velocity between the reflecting object and the LIDAR system (v) using Equation 4: $v = c*f_d/(2*f_c)$ where $f_d$ is approximated as the peak frequency output from the transform module 168, c is the speed of light, and $f_c$ represents the frequency of the LIDAR output signal.

Additional components can be added to the schematic of FIG. 7B. For instance, when the LIDAR system generates multiple LIDAR output signals or is used with other LIDAR systems that generate LIDAR output signals (i.e., by means of frequency or wavelength division multiplexing, FDM/WMD), the LIDAR system can include one or more filters to remove interfering signals from the real and/or imaginary components of the beating data signal and/or of the velocity data signal. Accordingly, the LIDAR system can include one or more filters in addition to the illustrated components. Suitable filters include, but are not limited to, lowpass filters. In the case of the optical design, if the frequency of the interfering components fall outside the bandwidth of the balance detector(s), additional filtering may not be necessary as it may be effectively provided by the balance detector(s).

The sampling rate that is used during the first period and the second period can be selected to have a value that is greater than or equal to the larger of two values selected from the group consisting of the minimum sampling rate for the first period and the minimum sampling rate for the second period. For instance, during the first period the range of rates for the first period sampling rate ($f_{s1}$) can be determined by $f_{s1} \geq 2 \times \alpha \tau_{0max}$ where $\tau_{0max}$ represents the maximum amount of time between the transmission of the LIDAR output signal and the receipt of the LIDAR input signal. During the second period, the range of rates for the second period sampling rate ($f_{s2}$) can be determined by $f_{s2} \geq 2 \times f_{dmax}$ where $f_{dmax}$ represents the maximum level of the Doppler shift of the LIDAR input signal relative to the LIDAR input signal for which the LIDAR system is to provide reliable results. The maximum is determined by the largest level for which the LIDAR system is to provide reliable results. Accordingly, the maximum distance generally corresponds to the distance for the field of view set in the LIDAR specifications and the maximum Doppler shift generally corresponds to the Doppler shift that would occur at the maximum radial velocity values set in the specifications. These two equations show that the minimum sampling rate for the first period is $2\alpha\tau_{0max}$ and the minimum sampling rate for the second period is $2f_{dmax}$. As a result, the sampling rate is selected to have a value that is greater than or equal to the larger of $2\alpha\tau_{0max}$ and $2f_{dmax}$. In other words, the sample rate used during the first period and the second period ($f_s$) is $f_s \geq \max(2\alpha\tau_{0max}, 2f_{dmax})$. In some instances, the sample rate used during the first period and the second period ($f_s$) is greater than or equal to 0.1 GHz, 0.2 GHz, or 0.5 GHz and/or less than 1 GHz, 2 GHz, or 4 GHZ.

The above description of the LIDAR system operation assumes that a modulator is present on the utility waveguide 12; however, the modulator is optional. In these instances, the electronics can operate the light source 10($s$) so as to increase the frequency of the outgoing LIDAR signal during the first period and during the second period the electronics can decrease the frequency of the outgoing LIDAR signal. Suitable methods for extracting the LIDAR data from the resulting composite signals are disclosed in U.S. Patent Application Ser. No. 62/671,913, filed on May 15, 2018, entitled "Optical Sensor Chip," and incorporated herein in its entirety.

Figure 8:
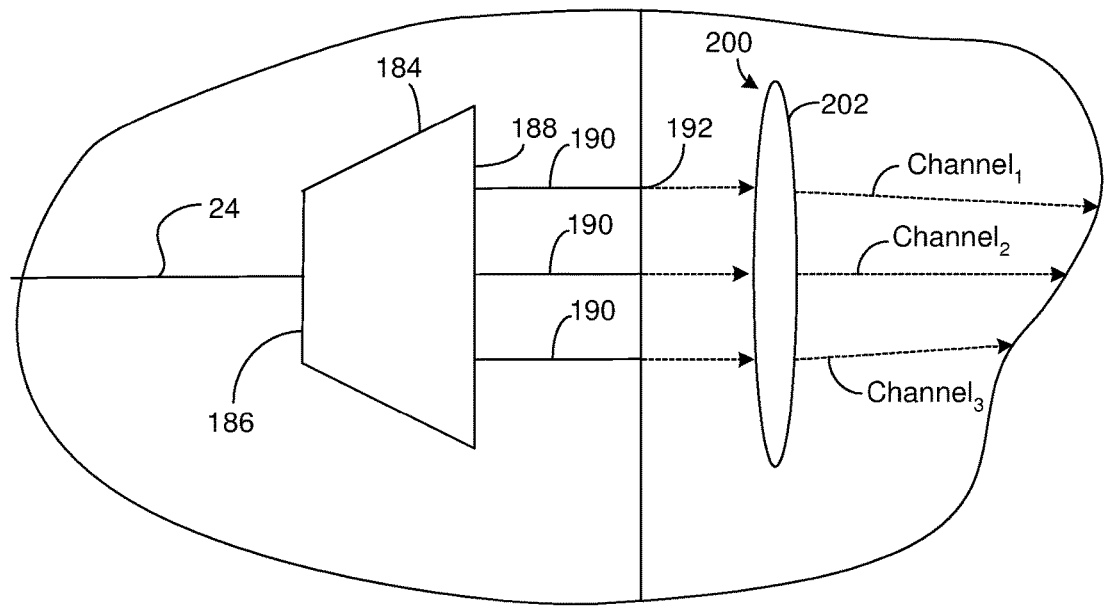
FIG. 8 illustrates an example of a demultiplexing component.

FIG. 8 illustrates an example of a suitable demultiplexing component 26 that optionally includes beam steering capability. The demultiplexing component 26 includes a demultiplexer 184 that receives the outgoing light signal from the LIDAR signal waveguide 24. The illustrated demultiplexer 184 includes an input side 186 through which the outgoing light signal is received although other configurations are possible. The demultiplexer 184 separates the outgoing light signal into different channel signals that are each associated with one of the channels. The illustrated demultiplexer 184 includes an output side 188 through which the channel signals exit from the demultiplexer 184 although other configurations are possible. The channel signals are each received on a different channel waveguide 190. For instance, in the illustrated demultiplexer, the channel signals can exit from the demultiplexer 184 through optical ports in the output side 188 and are each received on a different channel waveguide 190 connected to the output side 188. Each of the channel waveguides 190 ends at a facet 192 through which the channel signals exit from the channel waveguide 190. The channel signal that exits from a channel waveguide 190 serves as one of the LIDAR output signals. Since demultiplexer 184 embodiments can be constructed without the channel waveguides 190, the channel waveguides 190 are optional.

As noted above, the LIDAR output signals are reflected by an object located remotely from the LIDAR system. The reflected LIDAR output signals serve as the LIDAR input signal(s) which enter the channel waveguides 190, or when the channel waveguides 190 are not present, enter the demultiplexer 184 through the output side 188. In each case, the demultiplexer 184 receives the LIDAR input signal(s) and combines the LIDAR input signal(s) into the incoming LIDAR signal. The incoming LIDAR signal is received on the LIDAR signal waveguide 24. Accordingly, the incoming LIDAR signal can include, consists of, or consist essentially of light from the LIDAR input signals and the LIDAR output signals.

Suitable demultiplexers for use with a LIDAR system include, but are not limited to, Arrayed Waveguide Gratings (AWGs), echelle gratings, and reflection gratings. Suitable demultiplexers for integration into optical platforms such as silicon-on-insulator wafers include, but are not limited to, Arrayed Waveguide Gratings (AWGs), echelle gratings, and reflection gratings. The demultiplexer 184 separates the outgoing light signal into different channel signals that are each associated with one of the channels. Suitable demultiplexers for integration into optical platforms such as silicon-on-insulator wafers include, but are not limited to, Arrayed Waveguide Gratings (AWGs) and reflection gratings. Suitable demultiplexers for integration into optical platforms such as silicon-on-insulator wafers include, but are not limited to, Arrayed Waveguide Gratings (AWGs) and reflection gratings. Examples of suitable demultiplexers for integration into optical platforms such as silicon-on-insulator wafers can be found in U.S. Pat. No. 5,002,350, with patent application Ser. No. 485,014, filed on Feb. 26 1990, entitled Optical Multiplexer/Demultiplexer, and incorporated herein in its entirety, and in 'Design of Low-Loss and Polarization-Insensitive Reflection Grating-Based Planar Demultiplexers' by D. Chowdhury, in the IEEE Journal of Selected Topics in Quantum Electronics, Vol. 6, March/April 2000.

The LIDAR system also includes a beam distributor 200 that receives the LIDAR output signals and changes the direction of at least a portion of the LIDAR output signals such that different LIDAR output signals are distributed to different sample regions in the field of view. For example, suitable beam distributors can receive the LIDAR output signals and re-direct at least a portion of the LIDAR output signals such that the LIDAR output signals travel away from the beam distributor in different directions so different LIDAR output signals can be directed to different sample regions in the field of view. The beam distributor shown in FIG. 8 is a lens. FIG. 8 shows the path for the rays that are parallel to the lens optical axis being incident on different locations of the beam distributor 200. Examples of suitable beam distributors include, but are not limited to, passive components such as focusing mirrors and lenses. The beam distributor 200 can include or consist of a combination of different beam distributors. For instance, a suitable beam distributor 200 can include one or more lenses and one or more mirrors.

Figure 9A:
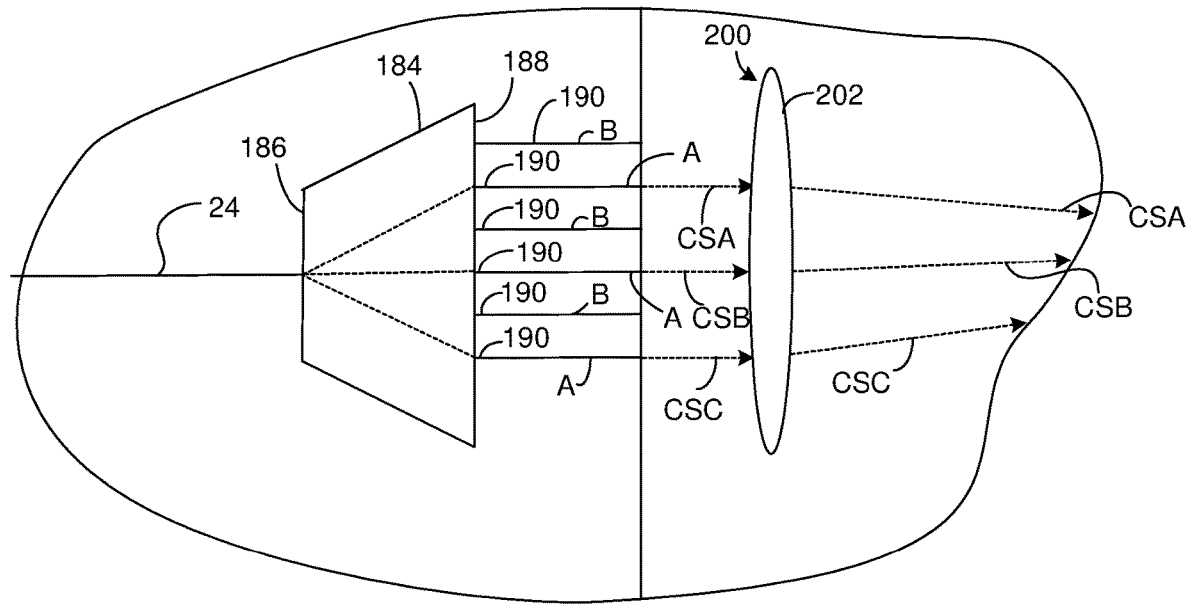
FIG. 9A through FIG. 9C illustrate the demultiplexing component of FIG. 8 modified to provide scanning of LIDAR output signals.
Figure 9B:
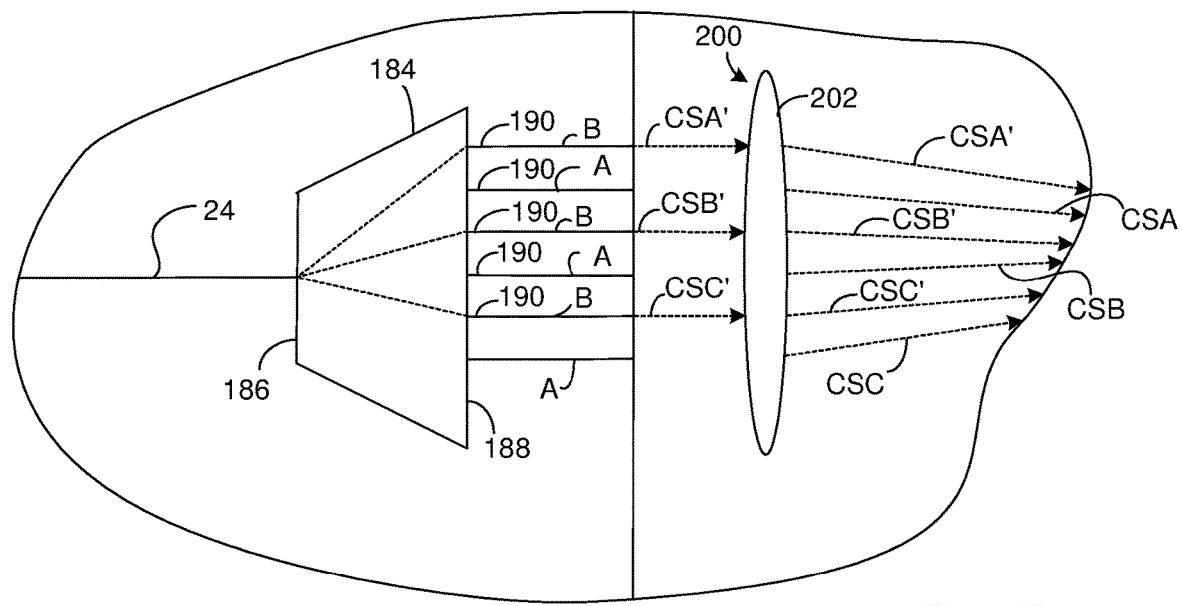

In some instances, it may be desirable to scan the LIDAR output signal(s) to different sample regions in the field of view. FIG. 9A and FIG. 9B illustrate the demultiplexer 184 of FIG. 8 modified to provide scanning of the LIDAR output signal(s). The demultiplexer 184 includes channel waveguides 190 arranged in one or more active groups where each active group includes one or more of the channel waveguides 190. In FIG. 9A and FIG. 9B, the channel waveguides 190 in a first active group are labeled A while the channel waveguides 190 in a second active group are labeled B. Different active groups include different selections of the channel waveguides; however, one or more of the channel waveguides 190 can belong to more than one active group.

When the demultiplexer 184 is tuned to one configuration, the channel waveguides in one of the active groups can each receive one of the channel signals while the channel waveguides in one or more other active groups do not receive channel signals. For instance, FIG. 9A shows the demultiplexer 184 tuned to a first configuration where each of the channel waveguides in the first active group receives one of the channel signals while none of the channel waveguides in the second active group receives one of the channel signals. When the demultiplexer 184 is tuned to another configuration, the channel waveguides in another one of the active groups can each receive one of the channel signals while the channel waveguides in one or more other active groups do not receive channel signals. For instance, FIG. 9B shows the demultiplexer 184 tuned to a second configuration where each of the channel waveguides in the second active group receives one of the channel signals while none of the channel waveguides in the first active group receives one of the channel signals.

As is evident from FIG. 9A and FIG. 9B, the channel waveguides can be arranged such that for all or a portion of the channel signals, the region of the beam distributor 200 that receives a channel signal (a LIDAR output signal) changes when the channel waveguide that receives the channel signal changes. In order to illustrate this, the LIDAR output signals for the first configuration are labeled CSA through CSC in FIG. 9A and FIG. 9B and the LIDAR output signals for the second configuration are labeled CSA' through CSC' in FIG. 9B. The LIDAR output signals labeled CSA and CSA' carry the same channel. The LIDAR output signals labeled CSB and CSB' carry the same channel. The LIDAR output signals labeled CSC and CSC' carry the same channel. As a result, FIG. 9B compares the directions each LIDAR output signal travels when in the LIDAR system is in the first configuration versus when the LIDAR system is in the second configuration.

Figure 9C:
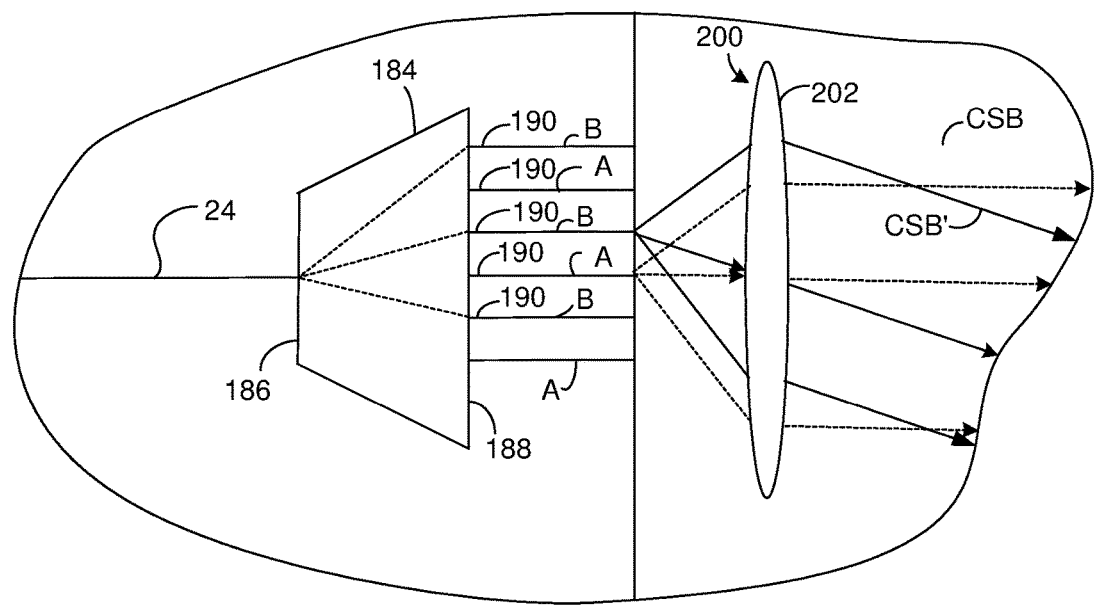

In FIG. 9A and FIG. 9B, the rays parallel to the lens optical axis are incident on different locations of the beam distributor 200 when in the different configurations. FIG. 9C illustrates the entire path of LIDAR output signal CSB and CSB' rather than only the ray parallel to the optical axis. Solid lines are used to illustrate the path of LIDAR output signal CSB' and dashed lines are used to illustrate the path of LIDAR output signal CSB. Each of the illustrated paths also includes the central ray. As is evident from comparing the paths of LIDAR output signal CSB and CSB', the channel waveguides 190 are configured such that the angle at which the paths, and the central ray, of the LIDAR output signal is incident on the beam distributor 200 changes in the different configurations. As a result, the direction that the LIDAR output signals travel away from the LIDAR system changes in response to the tuning of the demultiplexer 184. For instance, the LIDAR output signals in FIG. 9C are shown originating from different regions of a focal plane of the beam distributor 200 and traveling away from the LIDAR system in different directions in response to the tuning of the demultiplexer 184. Accordingly, the sample region to which all or a portion of the LIDAR output signals are directed changes in response to tuning of the demultiplexer 184. Accordingly, the demultiplexer 184 can be tuned so as to scan the LIDAR output signals from one sample region to another sample region. FIG. 9C illustrates the channel waveguides 190 be arranged such that the beam distributor receives all or a portion of the different LIDAR output signals on different regions of the beam distributor; however, the channel waveguides 190 can be arranged such that the beam distributor receives all or a portion of the different LIDAR output signals on the same or substantially the same region of the beam distributor.

A variety of mechanisms are available for tuning the demultiplexer so as to tune the path that each of the LIDAR output signals travels away from the demultiplexer. In some instances, the tuning mechanism tunes where the outgoing light signal is incident on the output side of the demultiplexer 184. Suitable mechanisms include, but are not limited to, heating and/or cooling of all or a portion of the demultiplexer 184 and phase tuning of the array waveguides in demultiplexers such as arrayed waveguide gratings (AWG). For instance, phase shifting devices such as PIN diodes can be used on all or a portion of the array waveguides in an AWG. Mechanical movement of the input waveguide 24 to tune where the channel signals are incident on the input side of the demultiplexer 184 can also be used to tune where the channel signals are incident on the output side of the demultiplexer 184.

Figure 10A:
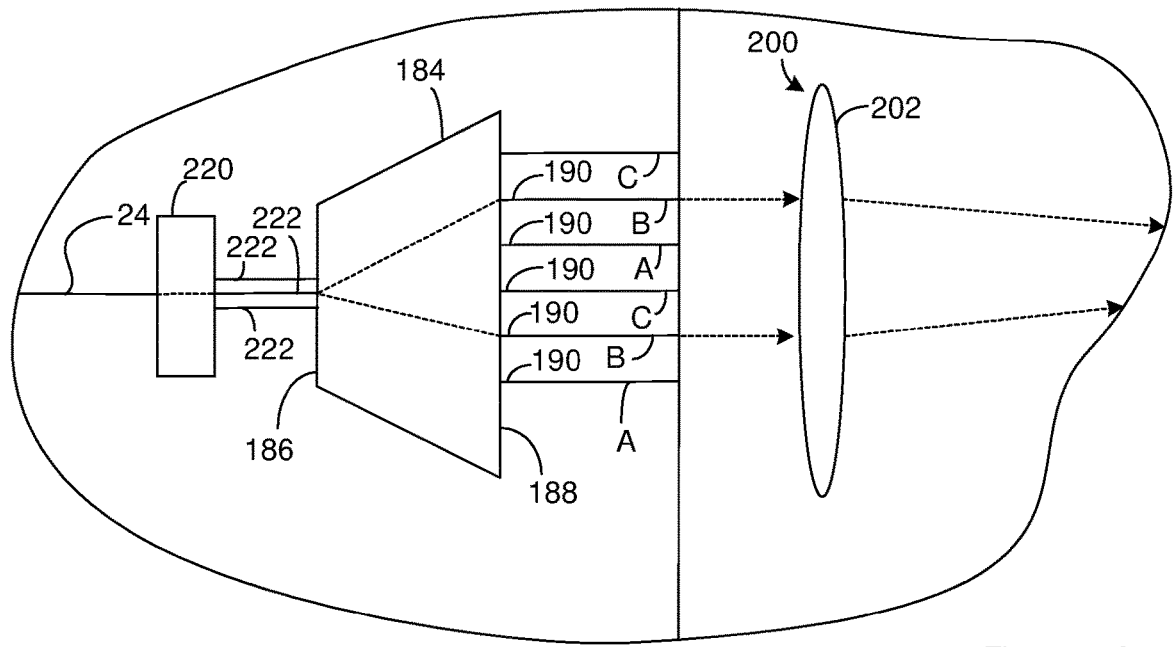
FIG. 10A and FIG. 10B illustrate the demultiplexing component of FIG. 9A and FIG. 9B modified to include a mechanism for tuning where the outgoing light signal is received on an input side of a demultiplexer.

Another mechanism for tuning the path that each of the LIDAR output signals travels away from the demultiplexer is to tune the path that the channel signals travel through the demultiplexer. For instance, the location where the channel signals are incident on an input side 186 of the demultiplexer 184 can be tuned so as to tune the path that the channel signals travel through the demultiplexer. FIG. 10A illustrate the demultiplexing component of FIG. 9A and FIG. 9B modified to include a mechanism for tuning where the outgoing light signal is received on the input side 186 of the demultiplexer 184. The LIDAR signal waveguide 24 guides the outgoing light signal to an optical switch 220. The electronics operate the optical switch 220 such that the outgoing light signal is directed to one of several input waveguides 222. Each of the input waveguides 222 is configured to carry the outgoing light signal to a different region on the input side 186 of the demultiplexer 184. Accordingly, the electronics can tune where the outgoing light signal is received on the input side 186 of the demultiplexer 184. As with the demultiplexing component of FIG. 9A and FIG. 9B, the demultiplexer 184 separates the outgoing light signal into different channel signals that are each associated with one of the channels. The channel signals that exit from the demultiplexer 184 are each received on a different channel waveguide 190. Each of the channel waveguides ends at a facet 192 through which the channel signals exit from the channel waveguide. The channel signals that exit from a channel waveguide each serve as one of the LIDAR output signals. Since demultiplexer 184 embodiments can be constructed without the channel waveguides 190, the channel waveguides 190 are optional.

The optical switch 220 can be configured to operate in both directions. For instance, when LIDAR output signals are reflected by an object located remotely from the LIDAR system, the reflected LIDAR output signals serve as the LIDAR input signal(s) which enter the demultiplexer 184 through the output side 188. The demultiplexer 184 receives the LIDAR input signal(s) and combines the LIDAR input signal(s) into an incoming LIDAR signal that is received on one of the input waveguides. The input waveguides 222 carry the incoming LIDAR signal to the optical switch 220. The optical switch directs the incoming LIDAR signal to the LIDAR signal waveguide 24.

Figure 10B:
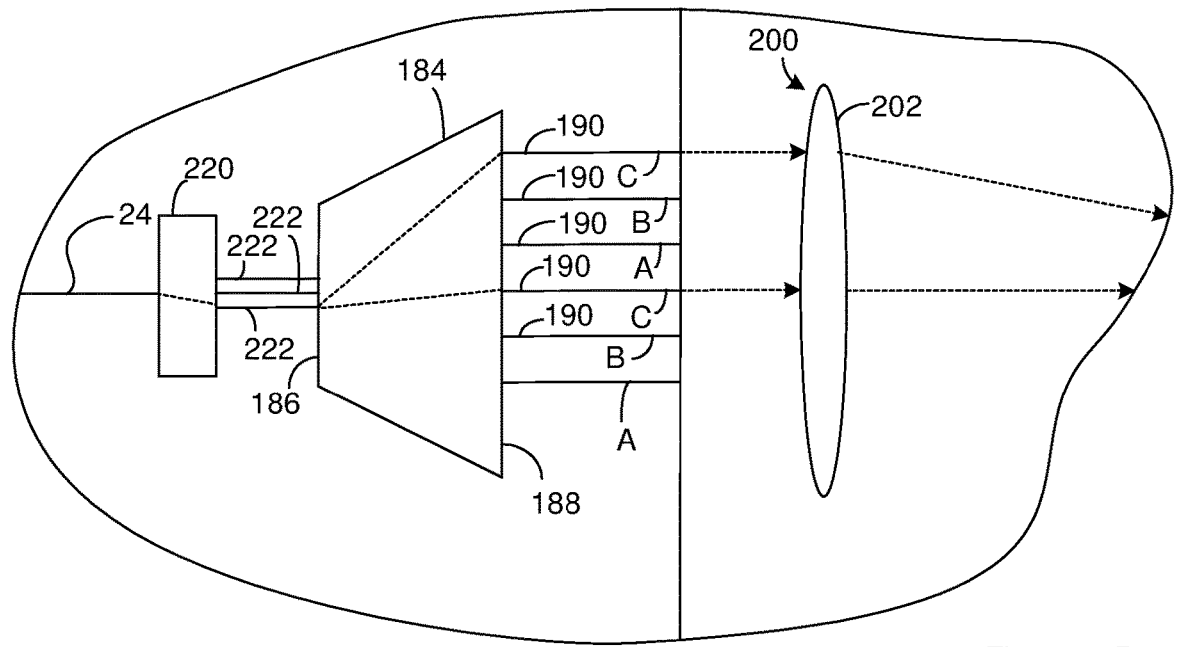

As disclosed in the context of FIG. 9A and FIG. 9B, the channel waveguides 190 are arranged in multiple different active groups where each active group includes one or more of the channel waveguides 190. In FIG. 10A and FIG. 10B, the channel waveguides in a first active group are labeled A, the channel waveguides in a second active group are labeled B, and the channel waveguides in a second active group are labeled C.

As is evident from FIG. 10A and FIG. 10B, the input waveguides 222 are arranged such that when the optical switch 220 directs the LIDAR input signal to one of the input waveguides, the channel waveguides in one of the active groups can each receive one of the channel signals while the channel waveguides in one or more other active groups do not receive channel signals. For instance, FIG. 10A shows the optical switch 220 directing the LIDAR input signal to a first one of the input waveguides and each of the channel waveguides in the second active group receives one of the channel signals while none of the channel waveguides in the first active group and the third active group receives one of the channel signals. When the optical switch 220 directs the LIDAR input signal to another one of the input waveguides, the channel waveguides in another one of the active groups can each receive one of the channel signals while the channel waveguides in one or more other active groups do not receive channel signals. For instance, FIG. 10B shows the optical switch 220 directing the LIDAR input signal to a second one of the input waveguides where each of the channel waveguides in the third active group receives one of the channel signals while none of the channel waveguides in the first active group and the second active group receives one of the channel signals.

As is described in the context of FIG. 9A and FIG. 9B, changing the active group that receives the channel signals changes the direction that the channel signals (LIDAR output signals) travel away from the LIDAR system. Accordingly, the sample regions on the field of view to which all or a portion of the LIDAR output signals are directed changes in response to the optical switch changing the input waveguide that receives the outgoing LIDAR signal. Accordingly, the electronics can operate the optical switch to as to scan the LIDAR output signals from one sample region to another sample region.

A variety of mechanisms are disclosed above for tuning where the channel signals are incident on the output side of the demultiplexer. A demultiplexing component can make use of more that one mechanism for tuning where the channel signals are incident on the output side of a demultiplexer. For instance, a demultiplexing component can be constructed as disclosed in the context of FIG. 10A and FIG. 10B and also include a tuning mechanism disclosed in the context of FIG. 9A and FIG. 9B.

In the LIDAR systems of FIG. 8 through FIG. 10B, the beam distributor 200 can optionally be immobilized relative to the demultiplexer. For instance, the beam distributor 200 and the demultiplexer can be integrated on the same LIDAR chip. Alternately, the beam distributor 200 and the demultiplexer can be immobilized on a common platform. In these instances, the above mechanisms for steering the LIDAR output signals provide a solid state steering solution.

In some instances, the beam distributor 200 is mobile relative to the demultiplexer. For instance, the electronics can operate an actuator that beam distributor 200 and/or the demultiplexer relative to one another so as to change where the channel signals are incident on the beam distributor 200. This change in location changes the direction of the LIDAR output signals and can be used to steer the LIDAR output signals as an alternative or in addition to the other mechanisms that are disclosed for steering the LIDAR output signals.

Figure 11:
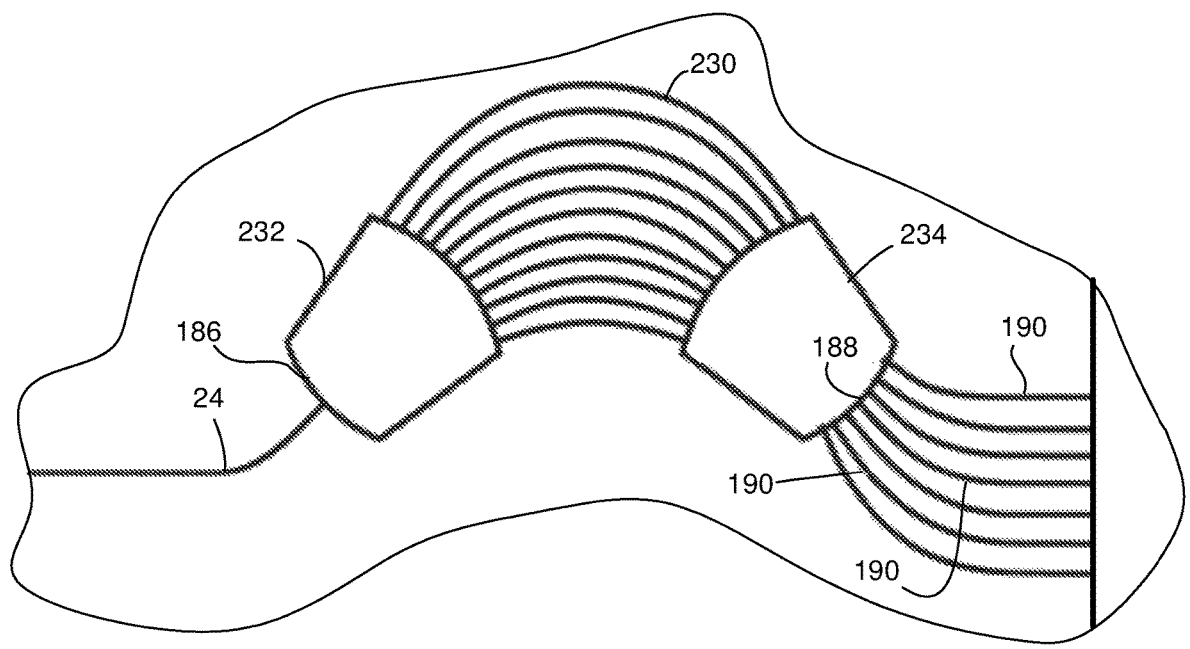
FIG. 11 is a topview of an arrayed waveguide grating demultiplexer for use as a demultiplexer in the demultiplexing components.

An example of a demultiplexer that is suitable for use as the demultiplexer of FIG. 8 through FIG. 10B is an arrayed waveguide grating demultiplexer. FIG. 11 is a topview of an Arrayed Waveguide Grating (AWG) demultiplexer construction that is suitable for integration use with a silicon-on-insulator wafer. The demultiplexer includes an arrayed waveguide grating 230 that provides an optical pathway between a first light distributor 232 and a second light distributor 234. The LIDAR signal waveguide 24 is interfaced with a side of the first light distributor that serves as the input side 186 of the demultiplexer. Alternately, the input waveguides 222 (not shown in FIG. 11) are interfaced with a side of the first light distributor that serves as the input side of the demultiplexer. The channel waveguides 190 are interfaced with a side of the second light distributor that serves as the output side 188 of the demultiplexer. Suitable components for the first light distributor and a second light distributor include, but are not limited to, star couplers. Suitable methods for tuning where the channel signals are incident on the output side 188 of a demultiplexer constructed according to FIG. 11 include, but are not limited to, temperature tuning such as thermo-optic tuning. Another suitable method for tuning where the channel signals are incident on the output side 188 of the demultiplexer include phase tuning all or a portion the waveguides in the arrayed waveguide grating 230 by means of heaters or PIN diodes. An example of a tunable demultiplexer constructed according to FIG. 11 can be found in 'Modeling and Validation of High Performance and Athermal AWGs for the Silicon Photonics Platform', Proceedings SPIE Vol. 9891 (2016).

Figure 12A:
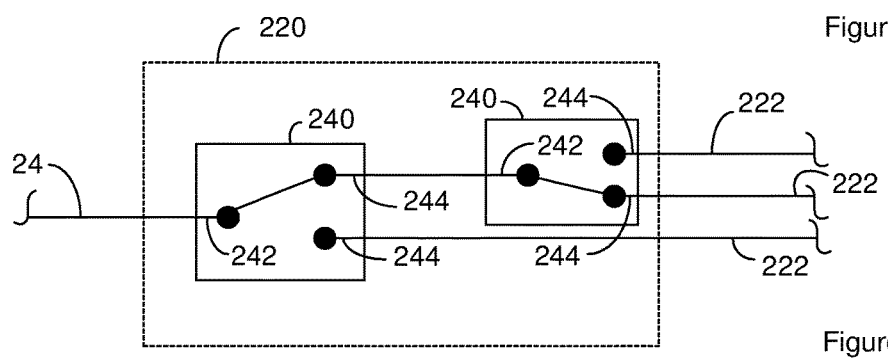
FIG. 12A and FIG. 12B illustrate construction of an optical switch suitable for use in the demultiplexing components of FIG. 10A through 10B.
Figure 12B:
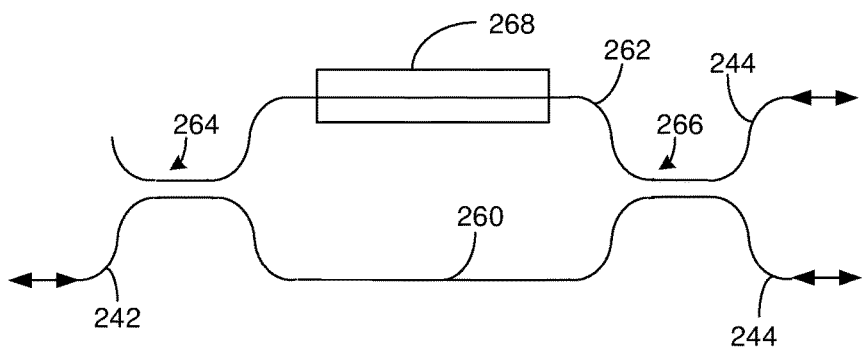

Suitable optical switches for use as the optical switch 220 of FIG. 10A include, but are not limited to, those operating on principles based on thermo-optical effects, electro-optical effects, and magneto-optical effects. FIG. 12A and FIG. 12B illustrate a construction of cascaded optical switches that is suitable for integration with a silicon-on-insulator wafer. FIG. 12A is a schematic of optical switch 220 that includes multiple 1×2 optical switches 240 that are cascaded so as to provide a 1×3 optical switch 220. The 1×2 optical switches 240 are each configured to switch a light signal received on a switch input waveguide 242 between different switch output waveguides 244. As is evident in FIG. 12A, the LIDAR signal waveguide 24 can serve as one of the switch input waveguide 242 and/or output waveguides 244 can serve as a switch input waveguide 242 for another 1×2 optical switch. Further, in some instances, a switch output waveguides 244 can serve as an input waveguides 222.

A variety of optical switches are suitable for use as the 1×2 optical switches. Examples of suitable 1×2 optical switches for integration into the silicon-on-insulator platform include, but are not limited to, Mach-Zehnder interferometers, tunable couplers, and splitters with attenuators. FIG. 12B is a schematic of a suitable Mach-Zehnder interferometer. The switch includes a first switch waveguide 260 that connects the switch input waveguide 242 and a switch output waveguide 244. A second switch waveguide 262 is connected to another switch output waveguide 244. The first switch waveguide 260 and the second switch waveguide 262 are included in a first optical coupler 264 and in a second optical coupler 266. A phase shifter 268 is positioned along the second switch waveguide 262 or the first switch waveguide 260 between the first optical coupler 264 and the second optical coupler 266. Suitable phase shifters include, but are not limited to, PIN diodes, PN junctions operated in carrier depletion mode, and thermal heaters.

The above LIDAR systems can be integrated on a single chip. A variety of platforms can be employed for a chip that includes the above LIDAR systems. A suitable platform includes, but is not limited to, a silicon-on-insulator wafer. One or more of the above components and/or portions of the above components can be integral with the chip or can be placed on the chip with technologies such as flip-chip bonding technologies. For instance, a light source 10 can include a gain element and one or more other components such as waveguides. The waveguide can be integral with the chip and the gain element can be a component that is separate from the chip but attached to the chip with a flip-chip bonding. Alternately, the above LIDAR system can be constructed with discrete components. For instance, all or a portion of the waveguides can be optical fibers connecting discrete components. Alternately, one or more portions of the LIDAR system can be integrated on a chip while other portions are discrete components. For instance, the utility waveguide 12 can be or include an optical fiber that provides optical communication between a light source 10 and an optical chip that includes the remainder of the LIDAR system.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
    a demultiplexer that separates an outgoing LIDAR signal into multiple LIDAR output signals that each carries a different channel;
    multiple input waveguides that are each configured to carry the outgoing LIDAR to a different region of an input side of the demultiplexer; and
    a beam distributor that receives each of the LIDAR output signals and directs the received LIDAR output signals such that different LIDAR output signals travel away from the beam distributor in different directions.

2. The system of claim 1, wherein the beam distributor is a convex lens.

3. The system of claim 1, further comprising: a mechanism for tuning where the LIDAR output signals are received on an output side of the demultiplexer.

4. The system of claim 3, wherein the tuning mechanism includes an optical switch configured to direct the outgoing LIDAR signal to any one of the input waveguides.

5. The system of claim 1, wherein multiple channel waveguides each receives a different one of the LIDAR output signals from the demultiplexer and the beam distributor receives the LIDAR output signals from the channel waveguides.

6. The system of claim 5, wherein the demultiplexer and the channel waveguides are positioned on a LIDAR chip.

7. The system of claim 6, wherein the LIDAR chip is constructed on a silicon-on-insulator platform.

8. The system of claim 7, wherein the demultiplexer is selected from a group consisting of an arrayed waveguide grating and an echelle grating.

9. The system of claim 5, wherein the channel waveguides are arranged in multiple active groups such that when the LIDAR system is tuned to a first configuration at least a portion of the LIDAR output signals are each directed to one of the channel waveguides in a first one of the active groups but none of the LIDAR output signals are directed to the channel waveguides in a second one of the active groups.

10. The system of claim 9, wherein when the LIDAR system is tuned to the first configuration all of the LIDAR output signals are each directed to one of the channel waveguides in the first active group.

11. The system of claim 9, wherein when the LIDAR system is tuned to a second configuration at least a portion of the LIDAR output signals are each directed to one of the channel waveguides in the second active group.

12. The system of claim 11, wherein when the LIDAR system is tuned to the second configuration all of the LIDAR output signals are each directed to one of the channel waveguides in the second active group.

13. The system of claim 12, wherein the beam distributor is configured such that the beam distributor receives the LIDAR output signals at different incident angles when the LIDAR system is tuned to the first configuration than when the LIDAR system is tuned to the second configuration.

14. The system of claim 13, wherein when the LIDAR system is tuned to the second configuration none of the LIDAR output signals are directed to the channel waveguides in the first group.

15. The system of claim 1, wherein the demultiplexer and the beam distributor are solid-state components.

16. The system of claim 1, wherein the beam distributor concurrently receives each of the LIDAR output signals.

17. A LIDAR system, comprising:
    a LIDAR chip that includes multiple channel waveguides, each channel waveguide guiding a LIDAR output signal carrying a different channel;
    a beam distributor that concurrently receives the LIDAR output signals from the channel waveguides,
        the beam distributor receiving the LIDAR output signals such that each LIDAR output signal is incident on the beam distributor at a different angle of incidence, and
        the beam distributor directing the received LIDAR output signals such that different LIDAR output signals travel away from the beam distributor in different directions;
    an optical switch configured to direct an outgoing LIDAR signal to any one of multiple different waveguides, the outgoing LIDAR signal carrying each of the channels; and
    electronics configured to operate the optical switch so as to change the input waveguide that receives the outgoing LIDAR signal,
        the direction that the LIDAR output signals travel away from the beam distributor changing in response to the change of the input waveguide that receives the outgoing LIDAR signal.

18. The system of claim 17, wherein the beam distributor is positioned off the LIDAR chip.

19. The system of claim 17, wherein each of the channel waveguides receives one of the LIDAR output signals from the same demultiplexer.

* * * * *